(12) United States Patent
Mochizuki et al.

(10) Patent No.: US 10,006,789 B2
(45) Date of Patent: Jun. 26, 2018

(54) CORRECTION APPARATUS FOR ANGLE SENSOR, AND ANGLE SENSOR

(71) Applicant: TDK CORPORATION, Tokyo (JP)

(72) Inventors: Shinichirou Mochizuki, Tokyo (JP); Hiraku Hirabayashi, Tokyo (JP); Tsuyoshi Umehara, Tokyo (JP); Hiroshi Naganuma, Tokyo (JP); Kazuya Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

(21) Appl. No.: 15/455,548

(22) Filed: Mar. 10, 2017

(65) Prior Publication Data

US 2017/0314975 A1 Nov. 2, 2017

(30) Foreign Application Priority Data

Apr. 27, 2016 (JP) .................................. 2016-089193
Jul. 15, 2016 (JP) .................................. 2016-139912

(51) Int. Cl.
*G01B 7/30* (2006.01)
*G01B 7/00* (2006.01)
*G01R 33/025* (2006.01)
*G01D 18/00* (2006.01)
*G01D 5/16* (2006.01)

(52) U.S. Cl.
CPC .............. *G01D 18/002* (2013.01); *G01D 5/16* (2013.01)

(58) Field of Classification Search
CPC ..................................... G01B 7/30; G01B 7/00
USPC ....................................... 324/207.12, 207.25
See application file for complete search history.

(56) References Cited

U.S. PATENT DOCUMENTS 7,071,681 B1 * 7/2006 Shiraki .............. G01D 5/24485
324/207.21
7,109,900 B2 * 9/2006 Kiriyama ........... G01D 5/24452
341/115

(Continued)

FOREIGN PATENT DOCUMENTS

JP 2008-509414 A 3/2008
JP 2008-304249 A 12/2008

OTHER PUBLICATIONS

Mar. 30, 2018 Office Action issued in Japanese Application No. 2016-139912.

*Primary Examiner* — Bot Ledynh
(74) *Attorney, Agent, or Firm* — Oliff PLC

(57) ABSTRACT

A correction apparatus for an angle sensor includes a correction unit for performing first correction processing on a first detection signal and performing second correction processing on a second detection signal. The first correction processing is processing for combining the first detection signal and a first correction value to generate a first corrected detection signal. The second correction processing is processing for combining the second detection signal and a second correction value to generate a second corrected detection signal. The first correction value has a first amplitude and varies with a first period. The second correction value has a second amplitude and varies with a second period. The first and second amplitudes are of the same value. The first and second periods are of the same value equal to ⅓ or ⅕ of the period of an ideal component of each of the first and second detection signals.

21 Claims, 15 Drawing Sheets

(56) References Cited

U.S. PATENT DOCUMENTS 7,250,881 B2 * 7/2007 Kiriyama ........... G01D 5/24452
   341/115
2006/0076480 A1    4/2006 Kiriyama et al.
2007/0288187 A1   12/2007 Finkler et al.

* cited by examiner

CORRECTION APPARATUS FOR ANGLE SENSOR, AND ANGLE SENSOR

BACKGROUND OF THE INVENTION

1. Field of the Invention

The present invention relates to a correction apparatus for correcting an error of an angle sensor that generates a detected angle value having a correspondence with an angle to be detected, and to an angle sensor including the correction apparatus.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. A system using the magnetic angle sensor is typically provided with a magnetic field generation unit for generating a rotating magnetic field whose direction rotates in response to the rotation or linear movement of an object. The magnetic field generation unit is a magnet, for example. The angle to be detected by the magnetic angle sensor is, for example, the angle that the direction of the rotating magnetic field in a reference position forms with respect to a reference direction.

Among known angle sensors is one that includes a detection signal generation unit for generating first and second detection signals 90° different in phase from each other and generates the detected angle value by performing an operation using the first and second detection signals. The detection signal generation unit includes a first detection circuit for outputting the first detection signal, and a second detection circuit for outputting the second detection signal. Each of the first and second detection circuits includes at least one magnetic detection element. The magnetic detection element includes, for example, a spin-valve magnetoresistance (MR) element including a magnetization pinned layer whose magnetization direction is pinned, a free layer whose magnetization direction varies depending on the direction of the rotating magnetic field, and a nonmagnetic layer located between the magnetization pinned layer and the free layer.

For the magnetic angle sensors, ideally, the first and second detection signals each have a waveform of a sinusoidal curve (including a sine waveform and a cosine waveform) when the direction of the rotating magnetic field changes with a constant angular velocity and the angle to be detected varies with a predetermined period. However, there are cases where the waveform of each detection signal is distorted from a sinusoidal curve. In such cases, the first detection signal contains a first ideal component which varies in such a manner as to trace an ideal sinusoidal curve and an error component other than the first ideal component, and the second detection signal contains a second ideal component which varies in such a manner as to trace an ideal sinusoidal curve and an error component other than the second ideal component. A distortion of the waveform of each detection signal may result in some error in the detected angle value. The error occurring in the detected angle value will hereinafter be referred to as angular error.

U.S. Patent Application Publication No. 2006/0076480 A1 discloses a technology for correcting two-phase sinusoidal signals that are different in phase from each other and outputted from an encoder for use to detect angles or other parameters. According to the technology, an error is detected from an ideal Lissajous waveform contained in a Lissajous waveform formed by the two-phase sinusoidal signals, and the two-phase sinusoidal signals are corrected on the basis of the detected error. The two-phase sinusoidal signals in U.S. Patent Application Publication No. 2006/0076480 A1 correspond to the foregoing first and second detection signals. A radius of the Lissajous waveform in U.S. Patent Application Publication No. 2006/0076480 A1 is equivalent to a square root of a square-sum signal made up of the sum of the square of the first detection signal and the square of the second detection signal.

The technology disclosed in U.S. Patent Application Publication No. 2006/0076480 A1 is to correct the first and second detection signals so as to reduce fluctuation in the magnitude of the square-sum signal. The technology thus enables reducing an angular error that causes fluctuation in the square-sum signal.

Angular errors may include an error that varies depending on the angle to be detected but causes no fluctuation in the magnitude of the square-sum signal. Among angular errors, one that causes fluctuation in the magnitude of the square-sum signal will hereinafter be referred to as error of the first type, and one that varies depending on the angle to be detected but causes no fluctuation in the magnitude of the square-sum signal will hereinafter be referred to as error of the second type.

A magnetic angle sensor suffers the error of the first type when, for example, the free layer of the MR element has a magnetic anisotropy in the magnetization direction of the magnetization pinned layer of the MR element, or when the magnetization direction of the magnetization pinned layer of the MR element varies due to the effect of the rotating magnetic field or other factors.

The error of the second type results from errors that occur in the same phase in the first detection signal and the second detection signal. More specifically, the error of the second type occurs due to deviations of the first detection signal and the second detection signal from the first ideal component and the second ideal component, respectively, by an amount corresponding to the error of the second type, depending on the angle to be detected.

A magnetic angle sensor suffers the error of the second type when, for example, the free layer of the MR element in the first detection circuit and the free layer of the MR element in the second detection circuit have magnetic anisotropies in the same direction, or when there is a misalignment of relative positions of the magnetic field generation unit and the detection signal generation unit with respect to each other.

An angular error occurring in an angle sensor without correction includes at least either one of the error of the first type and the error of the second type. If the angular error occurring without correction includes only the error of the second type, the technology disclosed in U.S. Patent Application Publication No. 2006/0076480 A1 could not reduce the angular error at all. If the angular error occurring without correction includes both of the error of the first type and the error of the second type, the technology disclosed in U.S. Patent Application Publication No. 2006/0076480 A1 could not sufficiently reduce the angular error.

SUMMARY OF THE INVENTION

It is an object of the present invention to provide a correction apparatus for an angle sensor and an angle sensor that enable reduction in angular error even in the case where the angular error occurring without correction includes the error of the second type.

A correction apparatus for an angle sensor of a first aspect of the present invention is for use in an angle sensor including: a detection signal generation unit for generating a first detection signal and a second detection signal each having a correspondence with an angle to be detected, and an angle detection unit for generating, on the basis of the first detection signal and the second detection signal, a detected angle value having a correspondence with the angle to be detected. An angle sensor of the first aspect of the invention includes the detection signal generation unit, the angle detection unit, and the correction apparatus of the first aspect of the invention.

In the correction apparatus of the first aspect of the invention, when the angle to be detected varies with a predetermined period, the first detection signal contains a first ideal component, a first third harmonic error component and a first fifth harmonic error component, while the second detection signal contains a second ideal component, a second third harmonic error component and a second fifth harmonic error component. The first ideal component and the second ideal component are different in phase from each other and vary periodically in such a manner as to trace an ideal sinusoidal curve.

The first third harmonic error component is an error component equivalent to a third harmonic of the first ideal component. The first fifth harmonic error component is an error component equivalent to a fifth harmonic of the first ideal component. The second third harmonic error component is an error component equivalent to a third harmonic of the second ideal component. The second fifth harmonic error component is an error component equivalent to a fifth harmonic of the second ideal component.

The correction apparatus of the first aspect of the present invention includes a correction unit for performing first correction processing on the first detection signal and performing second correction processing on the second detection signal. The first correction processing is processing for combining the first detection signal and a first correction value to generate a first corrected detection signal for use in generating the detected angle value. The second correction processing is processing for combining the second detection signal and a second correction value to generate a second corrected detection signal for use in generating the detected angle value.

The first correction value is a value having a first amplitude and varying with a first period. The second correction value is a value having a second amplitude and varying with a second period. The first amplitude and the second amplitude are of the same value. The first period and the second period are of the same value equal to ⅓ or ⅕ of the predetermined period.

In the correction apparatus and the angle sensor of the first aspect of the invention, the angle to be detected may be an angle that the direction of a rotating magnetic field in a reference position forms with respect to a reference direction.

In the correction apparatus and the angle sensor of the first aspect of the invention, the first third harmonic error component and the first fifth harmonic error component may be different in amplitude from each other, while the second third harmonic error component and the second fifth harmonic error component may be different in amplitude from each other.

In the correction apparatus and the angle sensor of the first aspect of the invention, the first amplitude and the second amplitude may be the absolute value of a value F for defining the first and second correction values. In such a case, the correction unit may generate the first and second correction values on the basis of the value F, the first detection signal and the second detection signal. The correction apparatus of the first aspect of the invention may further include a correction information storage unit for storing the value F.

In the correction apparatus and the angle sensor of the first aspect of the invention, the first ideal component and the second ideal component may be different in phase from each other by 90°.

The correction apparatus of the first aspect of the invention may further include a correction reference information storage unit and a correction information determination unit. The correction reference information storage unit stores information about a correspondence between a parameter value and the value F, the parameter value being determined by an operation using the first detection signal and the second detection signal. The correction information determination unit determines the parameter value by performing the operation using the first detection signal and the second detection signal, and refers to the information stored in the correction reference information storage unit to determine the value F corresponding to the determined parameter value.

In such a case, the first ideal component and the second ideal component may be different in phase from each other by 90°, and the parameter value may be determined from a variation component of the sum of the square of the first detection signal and the square of the second detection signal.

A correction apparatus for an angle sensor of a second aspect of the invention is for use in an angle sensor including: a detection signal generation unit for generating a first detection signal and a second detection signal each having a correspondence with an angle to be detected, and an angle detection unit for generating, on the basis of the first detection signal and the second detection signal, a detected angle value having a correspondence with the angle to be detected. An angle sensor of the second aspect of the invention includes the detection signal generation unit, the angle detection unit, and the correction apparatus of the second aspect of the invention.

In the correction apparatus of the second aspect of the invention, when the angle to be detected varies with a predetermined period, the first detection signal contains a first ideal component, a first error component, a second error component and a third error component, while the second detection signal contains a second ideal component, a fourth error component, a fifth error component and a sixth error component. The first ideal component and the second ideal component are different in phase from each other and vary periodically in such a manner as to trace an ideal sinusoidal curve.

The first error component and the second error component are error components both equivalent to a third harmonic of the first ideal component. The third error component is an error component equivalent to a fifth harmonic of the first ideal component. The fourth error component and the fifth error component are error components both equivalent to a third harmonic of the second ideal component. The sixth error component is an error component equivalent to a fifth harmonic of the second ideal component. The second error component and the third error component are of the same amplitude. The fifth error component and the sixth error component are of the same amplitude.

The correction apparatus of the second aspect of the invention includes an initial correction unit for performing first initial correction processing and second initial correction processing, and a subsequent correction unit for performing first subsequent correction processing and second subsequent correction processing.

The first initial correction processing is processing for correcting the first detection signal to generate a first initially-corrected detection signal in which the first error component is reduced relative to that in the first detection signal. The second initial correction processing is processing for correcting the second detection signal to generate a second initially-corrected detection signal in which the fourth error component is reduced relative to that in the second detection signal.

The first subsequent correction processing is processing for combining the first initially-corrected detection signal and a first correction value to generate a first subsequently-corrected detection signal in which the second and third error components are reduced relative to those in the first initially-corrected detection signal. The second subsequent correction processing is processing for combining the second initially-corrected detection signal and a second correction value to generate a second subsequently-corrected detection signal in which the fifth and sixth error components are reduced relative to those in the second initially-corrected detection signal. The first subsequently-corrected detection signal and the second subsequently-corrected detection signal are for use in generating the detected angle value.

The first correction value is a value having a first amplitude and varying with a first period. The second correction value is a value having a second amplitude and varying with a second period. The first amplitude and the second amplitude are of the same value. The first period and the second period are of the same value equal to ⅓ or ⅕ of the predetermined period.

In the correction apparatus and the angle sensor of the second aspect of the invention, the angle to be detected may be an angle that the direction of a rotating magnetic field in a reference position forms with respect to a reference direction.

In the correction apparatus and the angle sensor of the second aspect of the invention, the first amplitude and the second amplitude may be the absolute value of a value F for defining the first and second correction values.

In the correction apparatus and the angle sensor of the second aspect of the invention, the first ideal component and the second ideal component may be different in phase from each other by 90°.

In the correction apparatus and the angle sensor of the second aspect of the invention, the second error component and the third error component may have an initial phase of the same value α, with an initial phase of the first error component as 0. The fifth error component and the sixth error component may have an initial phase of the same value α, with an initial phase of the fourth error component as 0. In such a case, the subsequent correction unit may generate the first and second correction values on the basis of the value F, the value α, the first initially-corrected detection signal, and the second initially-corrected detection signal.

The correction apparatus of the second aspect of the invention may further include a correction information storage unit for storing the value F and the value α.

Alternatively, the correction apparatus of the second aspect of the invention may further include a correction reference information storage unit, a first correction information determination unit, and a second correction information determination unit. The correction reference information storage unit stores information about a correspondence between a parameter value and the values F and α, the parameter value being determined by an operation using the first detection signal and the second detection signal. The first correction information determination unit determines the parameter value by performing the operation using the first detection signal and the second detection signal. In such a case, the initial correction unit determines details of the first and second initial correction processing on the basis of the parameter value determined by the first correction information determination unit. The second correction information determination unit refers to the information stored in the correction reference information storage unit, and determines the value F and the value α corresponding to the parameter value determined by the first correction information determination unit. In such a case, the first ideal component and the second ideal component may be different in phase from each other by 90°, and the parameter value may be determined from a variation component of the sum of the square of the first detection signal and the square of the second detection signal.

The correction apparatus and the angle sensor of the first aspect of the invention and the correction apparatus and the angle sensor of the second aspect of the invention enable reduction in angular error even in the case where the angular error occurring without correction includes the error of the second type.

Other and further objects, features and advantages of the present invention will appear more fully from the following description.

DETAILED DESCRIPTION OF THE PREFERRED EMBODIMENTS

First Embodiment

Preferred embodiments of the present invention will now be described in detail with reference to the drawings. First, reference is made to FIG. 1 to describe the general configuration of an angle sensor system including an angle sensor according to a first embodiment of the invention.

Figure 1:
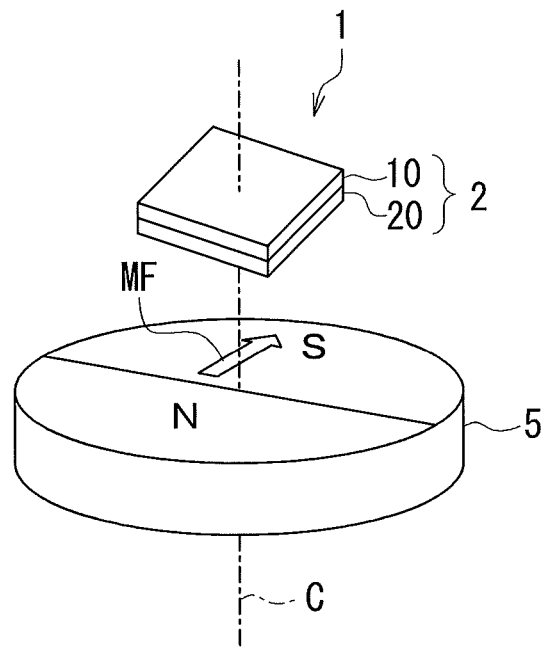
FIG. 1 is a perspective view illustrating the general configuration of an angle sensor system including an angle sensor according to a first embodiment of the invention.

The angle sensor 1 according to the first embodiment is configured to generate a detected angle value θs having a correspondence with an angle θ to be detected. The angle sensor 1 according to the present embodiment is a magnetic angle sensor, in particular. As shown in FIG. 1, the angle sensor 1 according to the present embodiment detects a rotating magnetic field MF whose direction rotates. In this case, the angle θ to be detected is the angle that the direction of the rotating magnetic field MF in a reference position forms with respect to a reference direction. The angle sensor system shown in FIG. 1 includes the angle sensor 1, and a magnet 5 having a cylindrical shape, which is an example of means for generating the rotating magnetic field MF. The magnet 5 has an N pole and an S pole that are arranged symmetrically with respect to an imaginary plane including the central axis of the cylindrical shape. The magnet 5 rotates about the central axis of the cylindrical shape. Consequently, the direction of the rotating magnetic field MF generated by the magnet 5 rotates about a center of rotation C including the central axis of the cylindrical shape.

The reference position is located within an imaginary plane parallel to an end face of the magnet 5. This imaginary plane will hereinafter be referred to as the reference plane. In the reference plane, the direction of the rotating magnetic field MF generated by the magnet 5 rotates about the reference position. The reference direction is located within the reference plane and intersects the reference position. In the following description, the direction of the rotating magnetic field MF in the reference position refers to a direction located within the reference plane. The angle sensor 1 is placed to face the aforementioned end face of the magnet 5.

The angle sensor system of the present embodiment may be configured in other ways than illustrated in FIG. 1. The angle sensor system of the present embodiment need only be configured to vary the relative positional relationship between the angle sensor 1 and the means for generating the rotating magnetic field MF so that the direction of the rotating magnetic field MF in the reference position rotates when viewed from the angle sensor 1. For example, the magnet 5 and the angle sensor 1 arranged as illustrated in FIG. 1 may be configured so that: the angle sensor 1 rotates while the magnet 5 is fixed; the magnet 5 and the angle sensor 1 rotate in mutually opposite directions; or the magnet 5 and the angle sensor 1 rotate in the same direction with mutually different angular velocities.

Alternatively, a magnet that includes one or more pairs of N and S poles arranged alternately in an annular shape may be employed in place of the magnet 5, and the angle sensor 1 may be placed in the vicinity of the outer circumference of the magnet. In such a case, at least one of the magnet and the angle sensor 1 rotates.

Alternatively, a magnetic scale that includes a plurality of pairs of N and S poles arranged alternately in a liner configuration may be employed in place of the magnet 5, and the angle sensor 1 may be placed in the vicinity of the periphery of the magnetic scale. In such a case, at least one of the magnetic scale and the angle sensor 1 moves linearly in the direction in which the N and S poles of the magnetic scale are aligned.

In the above-described various configurations of the angle sensor system, there also exists the reference plane having a predetermined positional relationship with the angle sensor 1, and in the reference plane, the direction of the rotating magnetic field MF rotates about the reference position when viewed from the angle sensor 1.

The angle sensor 1 includes a detection signal generation unit 2 for generating a first detection signal and a second detection signal each having a correspondence with the angle θ to be detected. The detection signal generation unit 2 includes a first detection circuit 10 for generating the first detection signal and a second detection circuit 20 for generating the second detection signal. For ease of understanding, FIG. 1 illustrates the first and second detection circuits 10 and 20 as separate components. However, the first and second detection circuits 10 and 20 may be integrated into a single component. Further, while in FIG. 1 the first and second detection circuits 10 and 20 are stacked in a direction parallel to the center of rotation C, the order of stacking may be inversed from that shown in FIG. 1. Each of the first and second detection circuits 10 and 20 includes at least one magnetic detection element for detecting the rotating magnetic field MF.

Figure 2:
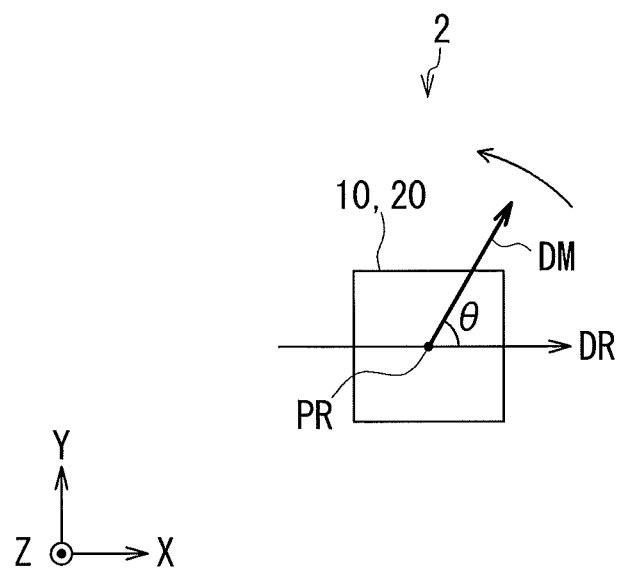
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the center of rotation C shown in FIG. 1 and from bottom to top in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The reference position PR is the position where the angle sensor 1 detects the rotating magnetic field MF. The reference direction DR shall be the X direction. As mentioned above, the angle θ to be detected is the angle that the direction DM of the rotating magnetic field MF in the reference position PR forms with respect to the reference direction DR. The direction DM of the rotating magnetic field MF shall rotate counterclockwise in FIG. 2. The angle θ will be expressed in positive values when seen counterclockwise from the reference direction DR, and in negative values when seen clockwise from the reference direction DR.

Figure 3:
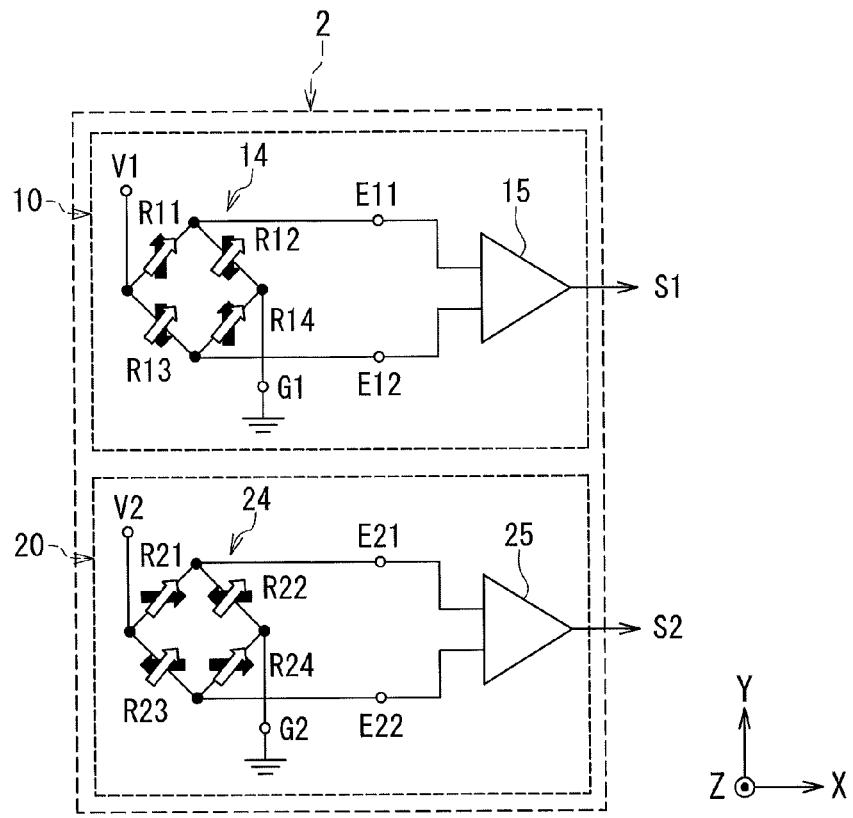
FIG. 3 is a circuit diagram illustrating the configuration of a signal generation unit of the angle sensor according to the first embodiment of the invention.

The configuration of the detection signal generation unit 2 will now be described in detail with reference to FIG. 3. FIG. 3 is a circuit diagram illustrating the configuration of the detection signal generation unit 2. As mentioned above, the detection signal generation unit 2 includes the first detection circuit 10 for generating the first detection signal S1 and the second detection circuit 20 for generating the second detection signal S2.

As the direction DM of the rotating magnetic field MF rotates with a predetermined period, the angle θ to be detected varies with the predetermined period T. In such a case, both of the first and second detection signals S1 and S2 vary periodically with a signal period equal to the aforementioned predetermined period T. The second detection signal S2 differs from the first detection signal S1 in phase. In the present embodiment, the phase of the second detection signal S2 preferably differs from the phase of the first detection signal S1 by an odd number of times ¼ the signal period. However, in consideration of the production accuracy of the magnetic detection elements and other factors, the difference in phase between the first detection signal S1 and the second detection signal S2 can be slightly different from an odd number of times ¼ the signal period. The following description assumes that the phases of the first detection signal S1 and the second detection signal S2 satisfy the aforementioned preferred relationship.

The first detection circuit 10 includes a Wheatstone bridge circuit 14 and a difference detector 15. The Wheatstone bridge circuit 14 includes a power supply port V1, a ground port G1, two output ports E11 and E12, a first pair of serially connected magnetic detection elements R11 and R12, and a second pair of serially connected magnetic detection elements R13 and R14. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded. The difference detector 15 outputs a signal corresponding to the potential difference between the output ports E11 and E12 as the first detection signal S1.

The second detection circuit 20 has a circuit configuration similar to that of the first detection circuit 10. More specifically, the second detection circuit 20 includes a Wheatstone bridge circuit 24 and a difference detector 25. The Wheatstone bridge circuit 24 includes a power supply port V2, a ground port G2, two output ports E21 and E22, a first pair of serially connected magnetic detection elements R21 and R22, and a second pair of serially connected magnetic detection elements R23 and R24. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded. The difference detector 25 outputs a signal corresponding to the potential difference between the output ports E21 and E22 as the second detection signal S2.

In the present embodiment, each of the magnetic detection elements R11 to R14 and R21 to R24 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction DM of the rotating magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In FIG. 3, the filled arrows indicate the magnetization directions of the magnetization pinned layers of the MR elements, and the hollow arrows indicate the magnetization directions of the free layers of the MR elements.

In the first detection circuit 10, the magnetization pinned layers of the MR elements included in the magnetic detection elements R11 and R14 are magnetized in the Y direction, and the magnetization pinned layers of the MR elements included in the magnetic detection elements R12 and R13 are magnetized in the −Y direction. In this case, the potential difference between the output ports E11 and E12 varies depending on the strength of a component in the Y direction (hereinafter, "Y-directional component") of the rotating magnetic field MF. Thus, the first detection circuit 10 detects the strength of the Y-directional component of the rotating magnetic field MF and generates a signal that indicates the strength as the first detection signal S1. The strength of the Y-directional component of the rotating magnetic field MF has a correspondence with the angle θ to be detected.

In the second detection circuit 20, the magnetization pinned layers of the MR elements included in the magnetic detection elements R21 and R24 are magnetized in the X direction, and the magnetization pinned layers of the MR elements included in the magnetic detection elements R22 and R23 are magnetized in the −X direction. In this case, the potential difference between the output ports E21 and E22 varies depending on the strength of a component in the X direction (hereinafter, "X-directional component") of the rotating magnetic field MF. Thus, the second detection circuit 20 detects the strength of the X-directional component of the rotating magnetic field MF and generates a signal that indicates the strength as the second detection signal S2. The strength of the X-directional component of the rotating magnetic field MF has a correspondence with the angle θ to be detected.

In consideration of the production accuracy of the MR elements and other factors, the magnetization directions of the magnetization pinned layers of the plurality of MR elements in the detection circuits 10 and 20 may be slightly different from those described above.

Figure 5:
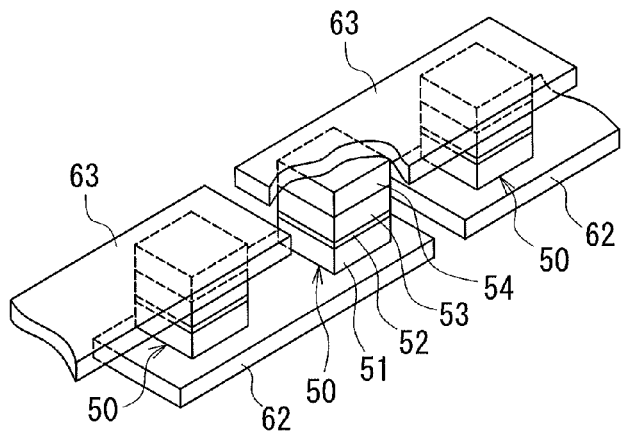
FIG. 5 is a perspective view of a portion of a magnetic detection element shown in FIG. 3.

An example of the configuration of the magnetic detection elements will now be described with reference to FIG. 5. FIG. 5 is a perspective view illustrating a portion of a magnetic detection element in the detection signal generation unit 2 shown in FIG. 3. In this example, the magnetic detection element includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 5, MR elements 50 are provided on the top surfaces of the lower electrodes 62, near opposite ends in the longitudinal direction. Each of the MR elements 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the plurality of MR elements 50 in the magnetic detection element shown in FIG. 5 are connected in series by the plurality of lower electrodes 62 and the plurality of upper electrodes 63. It should be appreciated that the layers 51 to 54 of the MR elements 50 may be stacked in an order reverse to that shown in FIG. 5.

As described previously, when the angle θ to be detected varies with the predetermined period T, the first and second detection signals S1 and S2 both vary periodically with a signal period equal to the predetermined period T. When the angle θ to be detected varies with the predetermined period T, each of the first and second detection signals S1 and S2 contains an ideal component and error components other than the ideal component. The ideal component varies periodically in such a manner as to trace an ideal sinusoidal curve (including a sine waveform and a cosine waveform). Hereinafter, the ideal component of the first detection signal S1 will be referred to as the first ideal component, and the ideal component of the second detection signal S2 will be referred to as the second ideal component. The first and second ideal components are different in phase, and have a predetermined phase relationship with each other. In particular, in the present embodiment, the first ideal component and the second ideal components are 90° different in phase. The following description assumes that the first and second detection signals S1 and S2 are both adjusted in level so that the centers of changes of their ideal components come to zero. The error components will be described later.

Figure 4:
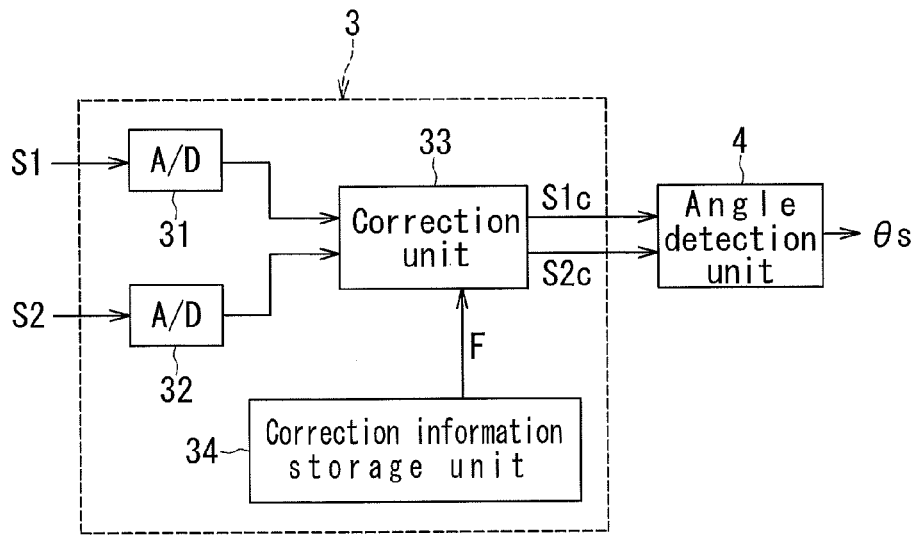
FIG. 4 is a functional block diagram illustrating the configuration of an angle detection unit and a correction apparatus according to the first embodiment of the invention.

Now, components of the angle sensor 1 other than the detection signal generation unit 2 will be described with reference to FIG. 4. The angle sensor 1 includes a correction apparatus 3 according to the present embodiment and an angle detection unit 4, in addition to the detection signal generation unit 2. FIG. 4 is a functional block diagram illustrating the configuration of the correction apparatus 3 and the angle detection unit 4. The correction apparatus 3 and the angle detection unit 4 can be implemented by an application-specific integrated circuit (ASIC) or a microcomputer, for example. On the basis of the first detection signal S1 and the second detection signal S2, the angle detection unit 4 generates a detected angle value θs having a correspondence with the angle θ to be detected.

The correction apparatus 3 includes analog-to-digital converters (hereinafter, "A/D converters") 31 and 32, a correction unit 33, and a correction information storage unit 34. The correction apparatus 3 and the angle detection unit 4 use digital signals. The A/D converter 31 converts the first detection signal S1 to a digital signal. The A/D converter 32 converts the second detection signal S2 to a digital signal. The correction unit 33 performs first correction processing on the first detection signal S1 having been converted to a digital signal by the A/D converter 31. The correction unit 33 performs second correction processing on the second detection signal S2 having been converted to a digital signal by the A/D converter 32.

The first correction processing is processing for combining the first detection signal S1 and a first correction value to generate a first corrected detection signal S1c. The first corrected detection signal S1c is a signal in which an error component to be described later is reduced relative to that in the first detection signal S1. The first corrected detection signal S1c is used for the generation of the detected angle value θs by the angle detection unit 4. The first correction value is a value that has a first amplitude and varies with a first period.

The second correction processing is processing for combining the second detection signal S2 and a second correction value to generate a second corrected detection signal S2c. The second corrected detection signal S2c is a signal in which an error component to be described later is reduced relative to that in the second detection signal S2. The second corrected detection signal S2c is used for the generation of the detected angle value θs by the angle detection unit 4. The second correction value is a value that has a second amplitude and varies with a second period. The first period and the second period are of the same value equal to ⅓ or ⅕ of the predetermined period T.

The first amplitude and the second amplitude are of the same value. In the present embodiment, the first and second amplitudes are particularly the absolute value of a value F for defining the first and second correction values. The correction information storage unit 34 stores the value F. The correction unit 33 generates the first and second correction values on the basis of the value F, the first detection signal S1 and the second detection signal S2. How to generate the first and second correction values will be described later.

Now, the error components of the first and second detection signals S1 and S2 will be described. The error components contained in the detection signals S1 and S2 can cause an error in the detected angle value θs. Hereinafter, an error occurring in the detected angle value θs will be referred to as angular error. Angular errors occurring without correction include the error of the first type and the error of the second type, as described previously.

A main component of the error of the first type occurs when the waveform of the first detection signal S1 and the waveform of the second detection signal S2 are distorted in a similar manner. The main component of the error of the first type varies with a period of ¼ the predetermined period T. Hereinafter, an angular error component that varies with a period of ¼ the predetermined period T will be referred to as the fourth-order angular error component. The error of the first type can be said to contain the fourth-order angular error component as its main component. Now, let sin θ be the first ideal component, and cos θ be the second ideal component. If the angular error occurring without correction includes only the error of the first type, the first detection signal S1 and the second detection signal S2 are expressible by the following Eqs. (1) and (2), respectively. In Eqs. (1) and (2), $A_1$ is a real number. In radian notation, the fourth-order angular error component of the error of the first type is $-A_1 \sin 4\theta$.

$$S1 = \sin\theta + A_1 \sin(3\theta - 180°) \quad (1)$$

$$S2 = \cos\theta + A_1 \cos 3\theta \quad (2)$$

A main component of the error of the second type results from errors that occur in the same phase in the first detection signal S1 and the second detection signal S2. The main component of the error of the second type varies with a period of ¼ the predetermined period T. In other words, the error of the second type contains the fourth-order angular error component as its main component. If the angular error occurring without correction includes only the error of the second type, the first detection signal S1 and the second detection signal S2 are expressible by the following Eqs. (3) and (4), respectively. In Eqs. (3) and (4), $A_2$ is a real number. In radian notation, the fourth-order angular error component of the error of the second type is $A_2 \sin 4\theta$.

$$S1 = \sin(\theta - A_2 \sin 4\theta) = \sin\theta \cdot \cos(A_2 \sin 4\theta) - \cos\theta \cdot \sin(A_2 \sin 4\theta) \quad (3)$$

$$S2 = \cos(\theta - A_2 \sin 4\theta) = \cos\theta \cdot \cos(A_2 \sin 4\theta) + \sin\theta \cdot \sin(A_2 \sin 4\theta) \quad (4)$$

If an angle x in radians is sufficiently small, cos x and sin x can be approximated by 1 and x, respectively. In the present embodiment, $A_2$ has so small a value that $\cos(A_2 \sin 4\theta)$ and $\sin(A_2 \sin 4\theta)$ can be approximated by 1 and $A_2 \sin 4\theta$, respectively. By applying such an approximation to Eqs. (3) and (4), the first detection signal S1 and the second detection signal S2 are expressed by the following Eqs. (5) and (6), respectively.

$$S1 \approx \sin\theta - \cos\theta \cdot A_2 \sin 4\theta \quad (5)$$
$$= \sin\theta - (A_2/2)\{\sin 5\theta - \sin(-3\theta)\}$$
$$= \sin\theta - (A_2/2)\sin 3\theta - (A_2/2)\sin 5\theta$$

$$S2 \approx \cos\theta + \sin\theta \cdot A_2 \sin 4\theta \quad (6)$$
$$= \cos\theta - (A_2/2)\{\cos 5\theta - \cos(-3\theta)\}$$
$$= \cos\theta - (A_2/2)\cos 3\theta - (A_2/2)\cos 5\theta$$

An angular error occurring without correction includes at least one of the error of the first type and the error of the second type. Thus, the first detection signal S1 and the second detection signal S2 are expressible by the following Eqs. (7) and (8), respectively.

$$S1 = \sin\theta + A_1 \sin(3\theta - 180°) - (A_2/2)\sin 3\theta - (A_2/2)\sin 5\theta \quad (7)$$

$$S2 = \cos\theta + A_1 \cos 3\theta + (A_2/2)\cos 3\theta - (A_2/2)\cos 5\theta \quad (8)$$

Here, "$A_1 \sin(3\theta - 180°)$" in Eq. (7) will be referred to as the first error component, "$-(A_2/2)\sin 3\theta$" the second error component, and "$-(A_2/2)\sin 5\theta$" the third error component. In Eq. (8), "$A_1 \cos 3\theta$" will be referred to as the fourth error component, "$(A_2/2)\cos 3\theta$" the fifth error component, and "$-(A_2/2)\cos 5\theta$" the sixth error component.

The first error component and the second error component are error components both equivalent to a third harmonic of the first ideal component sin θ. The third error component is an error component equivalent to a fifth harmonic of the first ideal component sin θ. The fourth error component and the fifth error component are error components both equivalent to a third harmonic of the second ideal component cos θ. The sixth error component is an error component equivalent to a fifth harmonic of the second ideal component cos θ. The second error component and the third error component are of the same amplitude. The fifth error component and the sixth error component are of the same amplitude.

Both the first and fourth error components are error components that cause the error of the first type. All the second, third, fifth and sixth error components are error components that cause the error of the second type. Assume that in each of the first and second detection signals S1 and S2 in the present embodiment, an error component that causes the error of the first type and an error component that causes the error of the second type have a phase difference of 0° or near 0°.

Figure 6:
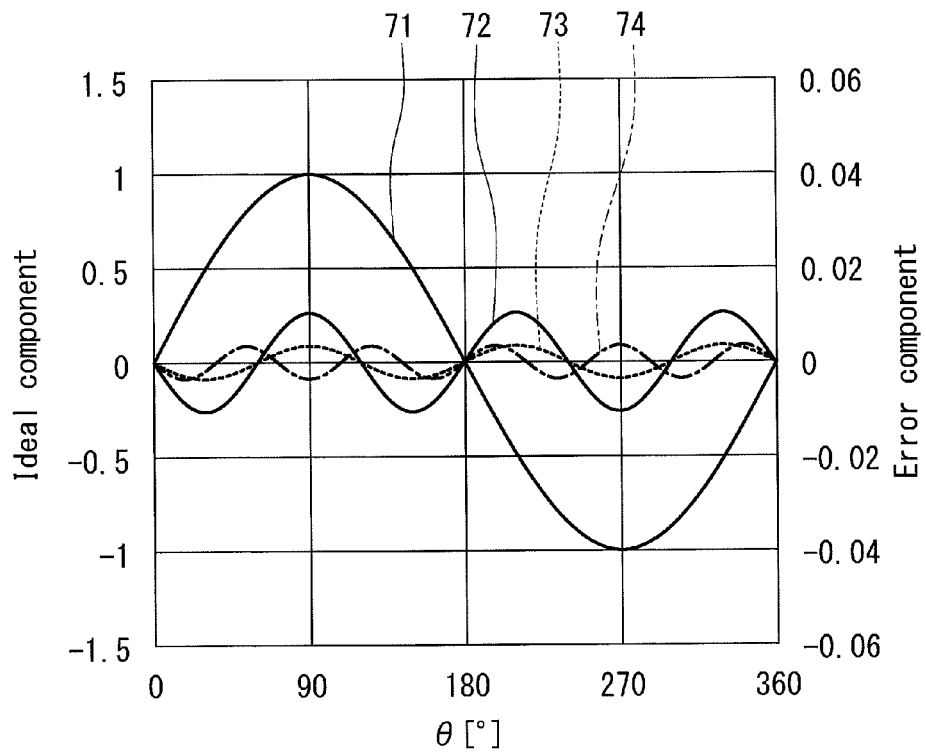
FIG. 6 is a waveform diagram illustrating an example of the waveforms of a first ideal component and error components of a first detection signal of the first embodiment of the invention.
Figure 7:
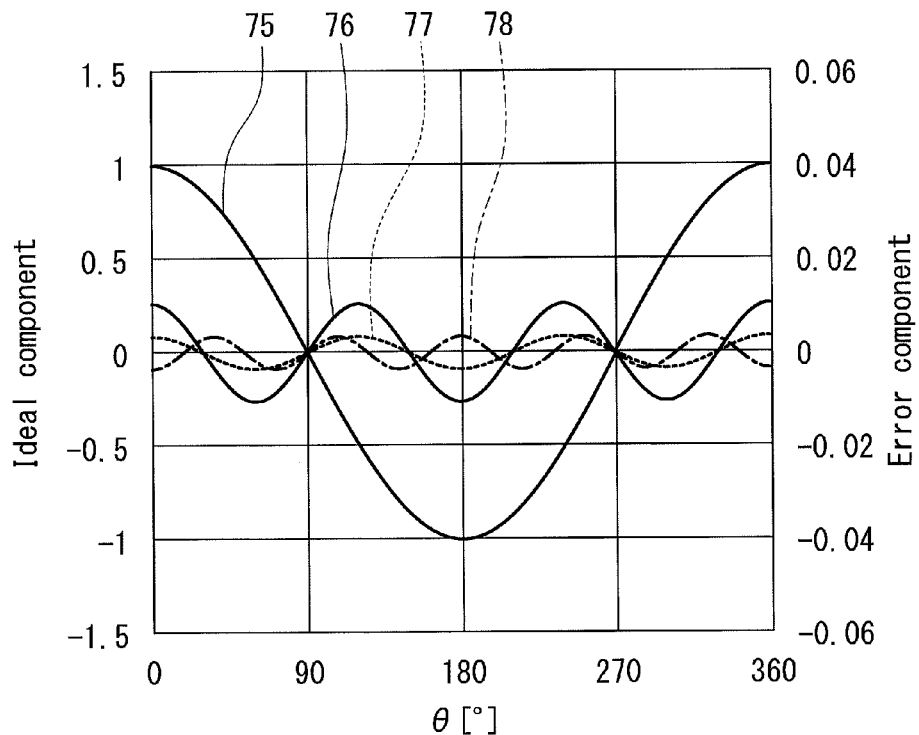
FIG. 7 is a waveform diagram illustrating an example of the waveforms of a second ideal component and error components of a second detection signal of the first embodiment of the invention.

FIG. 6 is a waveform diagram illustrating an example of the waveforms of the first ideal component and the first to third error components of the first detection signal S1. FIG. 7 is a waveform diagram illustrating an example of the waveforms of the second ideal component and the fourth to sixth error components of the second detection signal S2. In FIGS. 6 and 7, the horizontal axis represents the angle θ to be detected, the vertical axis on the left represents the ideal component, and the vertical axis on the right represents the error component. In FIGS. 6 and 7, the waveforms are normalized so that the first and second ideal components have an amplitude of 1. In FIG. 6 the reference numerals 71, 72, 73 and 74 represent the first ideal component, the first error component, the second error component and the third error component, respectively. In FIG. 7 the reference numerals 75, 76, 77 and 78 represent the second ideal component, the fourth error component, the fifth error component and the sixth error component, respectively. The waveforms shown in FIGS. 6 and 7 were generated on the basis of Eqs. (7) and (8).

The first error component and the second error component in Eq. (7) can be combined as like terms. The fourth error component and the fifth error component in Eq. (8) can also be combined as like terms. By combining the like terms, Eqs. (7) and (8) can be transformed into the following Eqs. (9) and (10).

$$S1 = \sin\theta + (A_1+A_2/2)\sin(3\theta-180°)-(A_2/2)\sin 5\theta \quad (9)$$

$$S2 = \cos\theta + (A_1+A_2/2)\cos 3\theta - (A_2/2)\cos 5\theta \quad (10)$$

Here, "$(A_1+A_2/2)\sin(3\theta-180°)$" in Eq. (9) will be referred to as the first third harmonic error component, and "$-(A_2/2)\sin 5\theta$" the first fifth harmonic error component. In Eq. (10), "$(A_1+A_2/2)\cos 3\theta$" will be referred to as the second third harmonic error component, and "$-(A_2/2)\cos 5\theta$" the second fifth harmonic error component. The first third harmonic error component is an error component equivalent to the third harmonic of the first ideal component $\sin\theta$. The first fifth harmonic error component is an error component equivalent to the fifth harmonic of the first ideal component $\sin\theta$. The second third harmonic error component is an error component equivalent to the third harmonic of the second ideal component $\cos\theta$. The second fifth harmonic error component is an error component equivalent to the fifth harmonic of the second ideal component $\cos\theta$.

The correction apparatus 3 according to the present embodiment is usable where the angular error occurring without correction includes the error of the second type. In such a case, the first detection signal S1 contains the first ideal component, the first third harmonic error component and the first fifth harmonic error component, and the second detection signal S2 contains the second ideal component, the second third harmonic error component, and the second fifth harmonic error component.

If the angular error occurring without correction includes only the error of the second type, the first third harmonic error component and the first fifth harmonic error component have the same amplitude, and the second third harmonic error component and the second fifth harmonic error component have the same amplitude. The case where $A_1=0$ and $A_2\neq 0$ in Eqs. (9) and (10) corresponds to such a case.

If the angular error occurring without correction includes both of the error of the first type and the error of the second type, the first third harmonic error component and the first fifth harmonic error component have respective different amplitudes, and the second third harmonic error component and the second fifth harmonic error component have respective different amplitudes. The case where $A_1\neq 0$ and $A_2\neq 0$ in Eqs. (9) and (10) corresponds to such a case.

Figure 8:
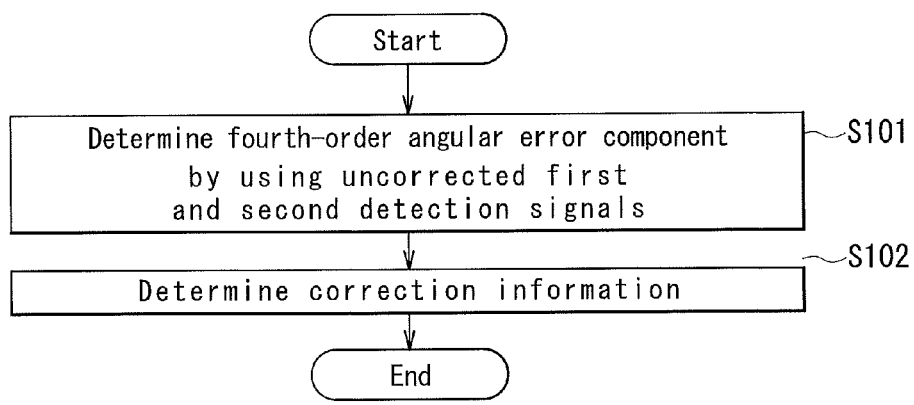
FIG. 8 is a flowchart illustrating a correction information determination procedure of the first embodiment of the invention.
Figure 9:
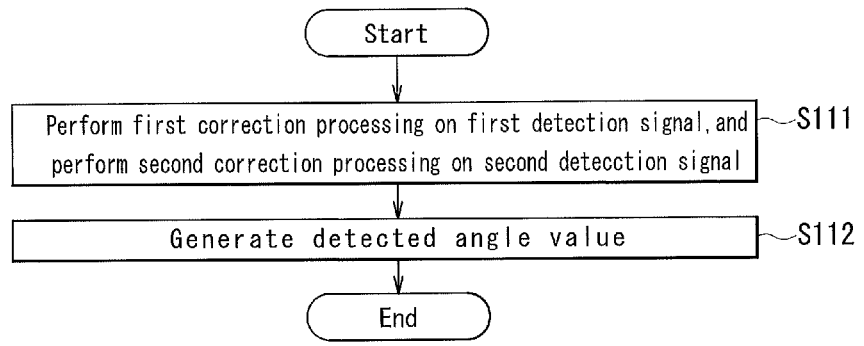
FIG. 9 is a flowchart illustrating an angle detection procedure of the first embodiment of the invention.

Now, the operations of the correction apparatus 3 and the angle detection unit 4 and a method for generating the detected angle value θs in the present embodiment will be described with reference to FIGS. 4, 8, and 9. The method for generating the detected angle value θs in the present embodiment includes a correction information determination procedure for determining correction information, and an angle detection procedure for generating the detected angle value θs. FIG. 8 is a flowchart illustrating the correction information determination procedure. The correction information determination procedure is performed by a control unit (not illustrated) outside the angle sensor 1 before shipment or use of the angle sensor 1. FIG. 9 is a flowchart illustrating the angle detection procedure. The angle detection procedure is performed when the angle sensor 1 is used.

The correction information determination procedure will be described first. The correction information determination procedure is performed in a situation in which the control unit can identify the angle θ to be detected. Examples of such a situation include where the angle θ is changed by a command from the control unit, and where the control unit can obtain information about the angle θ. Hereinafter, the angle θ identified by the control unit will be referred to as a reference angle θr, in particular. As shown in FIG. 8, the correction information determination procedure includes step S101 of determining the fourth-order angular error component by using the uncorrected first and second detection signals S1 and S2, and step S102 of determining the correction information. In step S101, the first detection signal S1 converted to a digital signal by the A/D converter 31 and the second detection signal S2 converted to a digital signal by the A/D converter 32 may be used.

In step S101, for example, an angular error for one period of the reference angle θr is calculated. A method for calculating the angular error at any given reference angle θr will be described below. Initially, a value corresponding to the detected angle value θs without correction is calculated on the basis of the uncorrected first and second detection signals S1 and S2. Such a value will hereinafter be referred to as an uncorrected detected angle value, and denoted by the symbol θp. Assume that a phase difference between the uncorrected detected angle value θp and the reference angle θr is 0° or near 0°. The uncorrected detected angle value θp is calculated by the following Eq. (11). Note that "a tan" in Eq. (11) represents arctangent.

$$\theta p = a\tan(S1/S2) \quad (11)$$

If θp is in the range of 0° to less than 360°, θp in Eq. (11) has two solutions 180° different in value. Which of the two solutions of θp in Eq. (11) is the true value of θp can be determined from the combination of positive and negative signs of S1 and S2. In step S101, θp is determined within the range of 0° to less than 360° on the basis of Eq. (11) and the foregoing determination on the combination of positive and negative signs of S1 and S2.

Next, a difference Ep between the uncorrected detected angle value θp and the reference angle θr is calculated by the following Eq. (12).

$$Ep = \theta p - \theta r \quad (12)$$

Figure 10:
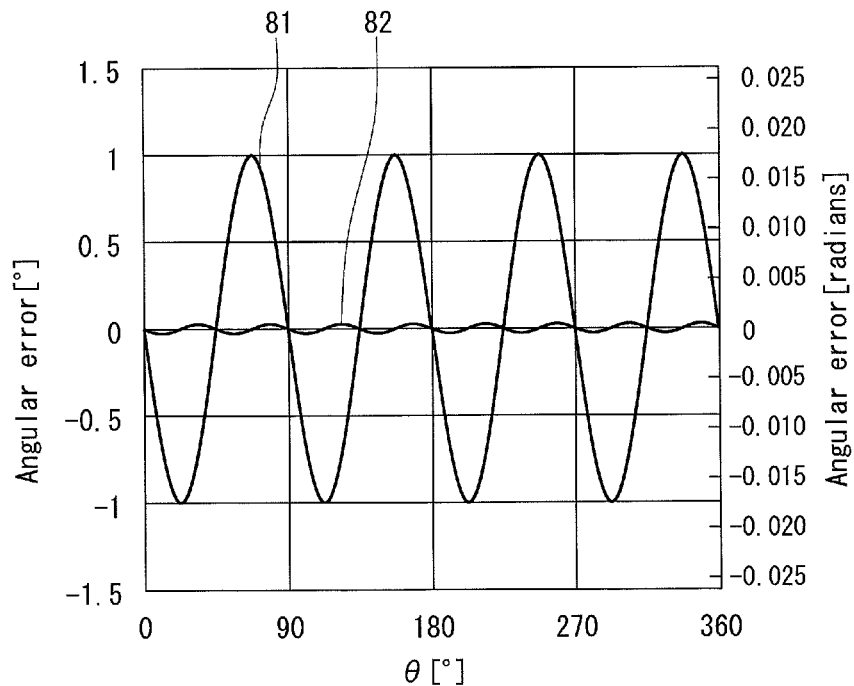
FIG. 10 is a waveform diagram illustrating an example of the waveform of an angular error of a detected angle value of the first embodiment of the invention.

The difference Ep corresponds to the angular error occurring without correction. Hereinafter, the difference Ep will be referred to as the angular error of the uncorrected detected angle value θp. The angular error Ep contains the fourth-order angular error component as its main component. In radian notation, the fourth-order angular error component is expressed as $-A_3\sin 4\theta$. $A_3$ is a real value. In step S101, $A_3$ is determined from the waveform of the angular error Ep determined as described above. If $A_3$ is determined, the fourth-order angular error component "$-A_3\sin 4\theta$" is identified. In such a manner, the fourth-order angular error component is determined. The waveform of the angular error Ep is shown in FIG. 10 to be described later.

In the present embodiment, the correction information refers to information on the value F mentioned previously. In step S102 of determining the correction information, the value F is determined on the basis of the fourth-order angular error component of the angular error Ep determined in step S101. In the present embodiment, $A_3$ is assumed as the value F. The value F is stored in the correction information storage unit 34.

The angle detection procedure will now be described. As shown in FIG. 9, the angle detection procedure includes step S111 of performing the first correction processing on the first detection signal S1 and performing the second correction processing on the second detection signal S2, and step S112 of generating the detected angle value θs.

Step S111 will be described first. Step S111 is performed by the correction unit 33. In step S111, the correction unit 33 initially refers to the correction information, i.e., the value F, stored in the correction information storage unit 34. The correction unit 33 then generates the first and second correction values C1 and C2 on the basis of the value F and the first detection signal S1.

As previously mentioned, the first period of the first correction value C1 and the second period of the second correction value C2 are of the same value equal to ⅓ or ⅕ of the predetermined period T. First, a description will be given of the case where the first period and the second period are of the same value equal to ⅓ of the predetermined period T. In this case, the first correction value C1 and the second correction value C2 are expressed by the following Eqs. (13) and (14), respectively.

$$C1 = -F \sin(3\theta p - 180°) \quad (13)$$

$$C2 = -F \cos 3\theta p \quad (14)$$

The correction unit 33 may determine the uncorrected detected angle value θp from the uncorrected first and second detection signals S1 and S2 by using Eq. (11), and substitute the determined θp into Eqs. (13) and (14) to determine the first and second correction values C1 and C2.

Alternatively, the correction unit 33 may determine the first and second correction values C1 and C2 as below, without determining the uncorrected detected angle value θp. Eqs. (13) and (14) can be transformed into the following Eqs. (15) and (16), respectively.

$$C1 = -F(4 \sin^3 \theta p - 3 \sin \theta p) \quad (15)$$

$$C2 = -F(4 \cos^3 \theta p - 3 \cos \theta p) \quad (16)$$

In Eqs. (15) and (16), sin θp and cos θp represent the values of the uncorrected first detection signal S1 and the uncorrected second detection signal S2, normalized to an amplitude of 1, respectively. The first and second correction values C1 and C2 can thus be calculated by using the value F, the value sin θp of the first detection signal S1 and the value cos θp of the second detection signal S2.

Next, a description will be given of the case where the first period and the second period are of the same value equal to ⅕ of the predetermined period T. In this case, the first correction value C1 and the second correction value C2 are expressed by the following Eqs. (17) and (18), respectively.

$$C1 = -F \sin(5\theta p - 180°) \quad (17)$$

$$C2 = F \cos 5\theta p \quad (18)$$

The correction unit 33 may determine the uncorrected detected angle value θp from the uncorrected first and second detection signals S1 and S2 by using Eq. (11), and substitute the determined θp into Eqs. (17) and (18) to determine the first and second correction values C1 and C2.

Alternatively, the correction unit 33 may determine the first and second correction values C1 and C2 as below, without determining the uncorrected detected angle value θp. Eqs. (17) and (18) can be transformed into the following Eqs. (19) and (20), respectively.

$$C1 = F(16 \sin^5 \theta p - 20 \sin^3 \theta p + 5 \sin \theta p) \quad (19)$$

$$C2 = F(16 \cos^5 \theta p - 20 \cos^3 \theta p + 5 \cos \theta p) \quad (20)$$

Thus, in the case where the first period and the second period are of the same value equal to ⅕ of the predetermined period T, the first and second correction values C1 and C2 can also be calculated by using the value F, the value sin θp of the first detection signal S1 and the value cos θp of the second detection signal S2.

In both of the cases where the first period and the second period are of the same value equal to ⅓ of the predetermined period T and where the first period and the second period are of the same value equal to ⅕ of the predetermined period T, the value F defines the amplitudes and phases of the first and second correction values C1 and C2.

After generating the first and second correction values C1 and C2 as described above, the correction unit 33 performs the first correction processing and the second correction processing. In the first correction processing, the first detection signal S1 and the first correction value C1 are combined to generate the first corrected detection signal S1c. In the second correction processing, the second detection signal S2 and the second correction value C2 are combined to generate the second corrected detection signal S2c. The first corrected detection signal S1c and the second corrected detection signal S2c are expressed by the following Eqs. (21) and (22), respectively.

$$S1c = S1 + C1 \quad (21)$$

$$S2c = S2 + C2 \quad (22)$$

The combination of C1 and C2 in Eqs. (21) and (22) may be that of C1 and C2 expressed by Eqs. (13) and (14), or that of C1 and C2 expressed by Eqs. (17) and (18).

Next, step S112 of generating the detected angle value θs will be described. Step S112 is performed by the angle detection unit 4. In step S112, the angle detection unit 4 calculates the detected angle value θs on the basis of the first and second corrected detection signals S1c and S2c generated in step S111. Specifically, for example, the angle detection unit 4 calculates θs by the following Eq. (23).

$$\theta s = a \tan(S1c/S2c) \quad (23)$$

If θs is in the range of 0° to less than 360°, θs in Eq. (23) has two solutions 180° different in value. Which of the two solutions of θs in Eq. (23) is the true value of θs can be determined from the combination of positive and negative signs of S1c and S2c. The angle detection unit 4 determines θs within the range of 0° to less than 360° on the basis of Eq. (23) and the foregoing determination on the combination of positive and negative signs of S1c and S2c.

Now, an angular error Es of the detected angle value θs will be described. FIG. 10 is a waveform diagram illustrating an example of the waveform of the angular error Es of the detected angle value θs. In FIG. 10, the horizontal axis represents the angle θ to be detected which is equal to the reference angle θr, the vertical axis on the left represents the angular error in degrees (°), and the vertical axis on the right represents the angular error in radians. In FIG. 10, the reference numeral 81 represents the angular error Ep of the uncorrected detected angle value θp, and the reference numeral 82 represents the angular error Es of the detected angle value θs. In FIG. 10, the angular error Ep was determined for one period of the uncorrected detected angle value θp. The angular error Ep at any given uncorrected detected angle value θp was calculated as described below in a situation in which the reference angle θr equivalent to the angle θ was identified. Initially, the uncorrected detected angle value θp was determined by using Eq. (11). S1 and S2 expressed by Eqs. (9) and (10) were used for S1 and S2 in Eq. (11). It was assumed that $A_1 \neq 0$ and $A_2 \neq 0$. Next, the angular error Ep was calculated by using Eq. (12). The angular error Ep includes both of the error of the first type and the error of the second type.

Further, in FIG. 10, the angular error Es was determined for one period of the detected angle value θs. The angular error Es at any given detected angle value θs was calculated as described below in a situation in which the reference angle θr equivalent to the angle θ was identified. Initially, the uncorrected detected angle value θp was determined by using Eq. (11), and the determined θp was substituted into Eqs. (17) and (18) to determine the first and second correction values C1 and C2. S1 and S2 expressed by Eqs. (9) and (10) were used for S1 and S2 in Eq. (11). It was assumed that $A_1 \neq 0$ and $A_2 \neq 0$. Next, the first and second corrected detection signals S1c and S2c were determined by using Eqs. (21) and (22). Next, the detected angle value θs was calculated by using Eq. (23). Next, the angular error Es was calculated by the following Eq. (24) similar to Eq. (12).

$$Es = \theta s - \theta r \qquad (24)$$

As shown in FIG. 10, it can be seen that the angular error Es of the detected angle value θs is sufficiently small, compared with the angular error Ep of the uncorrected detected angle value θp. The present embodiment thus enables reduction in the angular error Es of the detected angle value θs even in the case where the angular error occurring without correction includes the error of the second type.

The effects of the correction apparatus 3 according to the present embodiment will be described in more detail below by comparison with the correction method described in U.S. Patent Application Publication No. 2006/0076480 A1. The correction method described in U.S. Patent Application Publication No. 2006/0076480 A1 will hereinafter be referred to as the conventional correction method. An angular error occurring without correction includes at least either one of the error of the first type and the error of the second type. As described previously, if the angular error occurring without correction includes the error of the second type, the conventional correction method is not able to sufficiently reduce the angular error.

Figure 11:
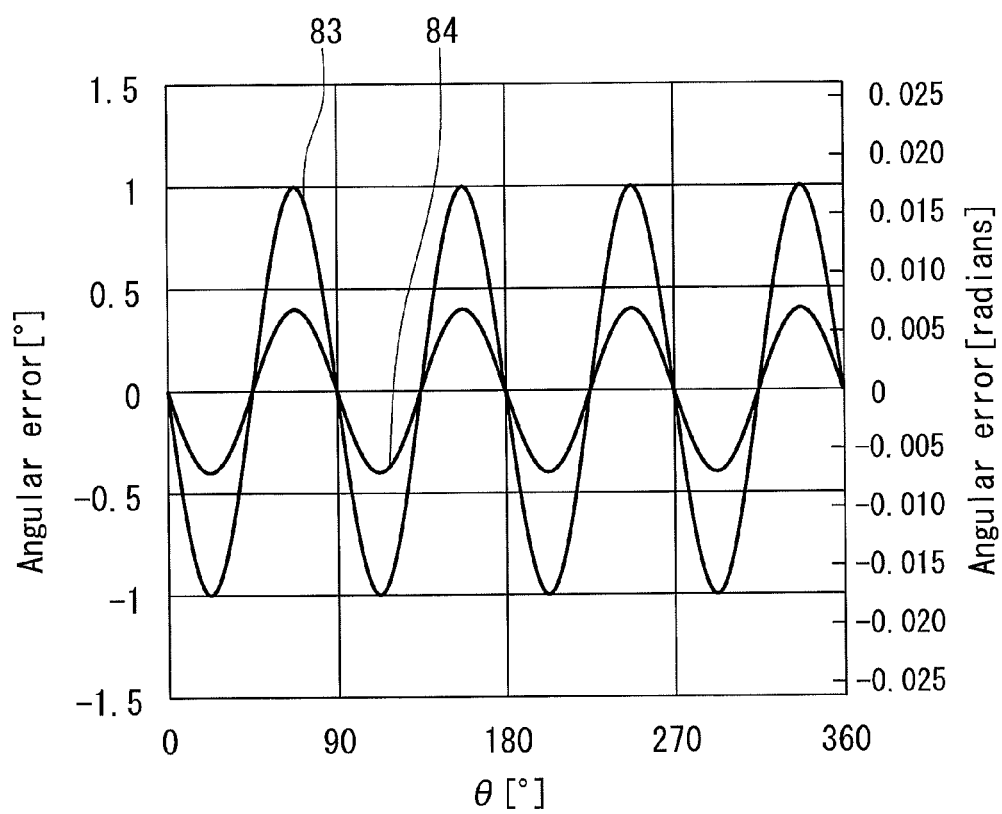
FIG. 11 is a waveform diagram illustrating an example of the waveform of an angular error of a detected angle value according to a conventional correction method.

FIG. 11 is a waveform diagram illustrating an example of the waveform of the angular error of the detected angle value according to the conventional correction method. In FIG. 11, the horizontal axis represents the angle θ to be detected which is equal to the reference angle θr, the vertical axis on the left represents the angular error in degrees (°), and the vertical axis on the right represents the angular error in radians. In FIG. 11, the reference numeral 83 represents the angular error occurring without correction, and the reference numeral 84 represents the angular error of the detected angle value according to the conventional correction method. The angular error represented by the reference numeral 83 is the same as the angular error Ep represented by the reference numeral 81 in FIG. 10.

The angular error of the detected angle value according to the conventional correction method was calculated as described below. Initially, the first and second detection signals S1 and S2 were corrected by the convention correction method. Note that the conventional correction method is the same as first and second initial correction processing, which will be described in relation to a third embodiment. Next, the detected angle value was calculated by Eq. (23) with S1c and S2c in Eq. (23) replaced with the first and second detection signals S1 and S2 corrected by the conventional correction method. Then, the angular error was calculated by Eq. (24) with the above-calculated detected angle value as θs in Eq. (24).

As shown in FIG. 11, the angular error of the detected angle value according to the conventional method is greater than the angular error Es of the detected angle value θs according to the present embodiment, which is represented by the reference numeral 82 in FIG. 10. The angular error of the detected angle value according to the conventional correction method is almost equal to the error of the second type. In other words, the convention correction method is not capable of reducing the error of the second type at all.

In contrast, the correction apparatus 3 according to the present embodiment is capable of sufficiently reducing the angular error Es of the detected angle value θs as described above even in the case where the angular error Ep occurring without correction includes the error of the second type.

The correction apparatus 3 according to the present embodiment is capable of sufficiently and easily reducing the angular error Es of the detected angle value θs even in the case where the angular error occurring without correction includes both of the error of the first type and the error of the second type. Such an effect will be described in detail below.

Suppose that the first detection signal S1 and the second detection signal S2 are expressed by Eqs. (9) and (10), respectively. To reduce the angular error in such a case, correction processing of a comparative example as described below may be performed on the first detection signal S1 and the second detection signal S2. In the correction processing of the comparative example, the first detection signal S1 is combined with a correction value that has the same amplitude as that of the first third harmonic error component and a phase 180° different from that of the first third harmonic error component, and a correction value that has the same amplitude as that of the first fifth harmonic error component and a phase 180° different from that of the first fifth harmonic error component. Further, in the correction processing of the comparative example, the second detection signal S2 is combined with a correction value that has the same amplitude as that of the second third harmonic error component and a phase 180° different from that of the second third harmonic error component, and a correction value that has the same amplitude as that of the second fifth harmonic error component and a phase 180° different from that of the second fifth harmonic error component.

The correction processing of the comparative example has the following disadvantages. First, to perform the correction processing of the comparative example, the first third harmonic error component and the first fifth harmonic error component need to be extracted from the first detection signal S1. Also, the second third harmonic error component and the second fifth harmonic error component need to be extracted from the second detection signal S2. Then, the extracted harmonic error components need to be analyzed. Further, the correction processing of the comparative example is complicated.

In contrast, the present embodiment enables reducing the angular error Es of the detected angle value θs by much simpler processing than the correction processing of the comparative example. More specifically, according to the present embodiment, the first detection signal S1 and the first correction value C1 are combined to generate the first corrected detection signal S1c, and the second detection signal S2 and the second correction value C2 are combined to generate the second corrected detection signal S2c. The first correction value C1 is a value that has a first amplitude and varies with a first period. The second correction value C2 is a value that has a second amplitude and varies with a second period. The first amplitude and the second amplitude are of the same value. The first period and the second period are of the same value equal to ⅓ or ⅕ of the predetermined period T.

According to the present embodiment, the first correction value C1 is a value that varies with a single first period even though the first detection signal S1 contains the first third harmonic error component and the first fifth harmonic error component. Likewise, the second correction value C2 is a value that varies with a single second period even though the second detection signal S2 contains the second third harmonic error component and the second fifth harmonic error component. Moreover, the first amplitude and the second amplitude are of the same value, and also, the first period and the second period are of the same value.

As described above, the present embodiment enables reducing the angular error Es of the detected angle value θs by simple processing even in the case where the angular error occurring without correction includes the error of the second type.

According to the present embodiment, the details of the first and second correction processing need not be changed according to whether the angular error occurring without correction includes only the error of the second type or both of the error of the first type and the error of the second type. The present embodiment thus enables reducing the angular error Es of the detected angle value θs without the need for considering whether the angular error occurring without correction includes only the error of the second type or both of the error of the first type and the error of the second type.

The present embodiment enables reducing both of the error of the first type and the error of the second type at the same time when the angular error occurring without correction includes both of the error of the first type and the error of the second type.

Second Embodiment

Figure 12:
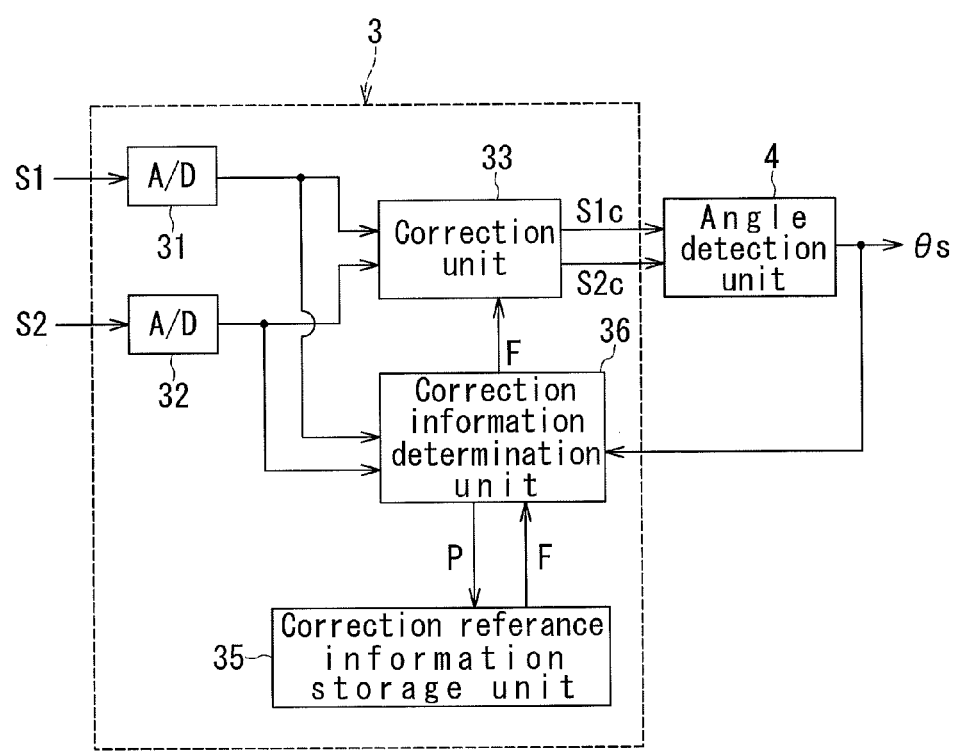
FIG. 12 is a functional block diagram illustrating the configuration of an angle detection unit and a correction apparatus according to a second embodiment of the invention.

A second embodiment of the invention will now be described. First, the configuration of the correction apparatus 3 according to the second embodiment will be described with reference to FIG. 12. FIG. 12 is a functional block diagram illustrating the configuration of the correction apparatus 3 and the angle detection unit 4. The correction apparatus 3 according to the second embodiment includes a correction reference information storage unit 35 and a correction information determination unit 36, in place of the correction information storage unit 34 of the first embodiment.

The correction reference information storage unit 35 stores information about a correspondence between a parameter value P and the value F. The parameter value P is determined by an operation using the first detection signal S1 and the second detection signal S2. The correction information determination unit 36 determines the parameter value P by performing the operation using the first detection signal S1 and the second detection signal S2, and refers to the information stored in the correction reference information storage unit 35 to determine the value F corresponding to the determined parameter value P.

A method for generating the detected angle value θs in the present embodiment will now be described. The method for generating the detected angle value θs in the present embodiment includes a correction reference information generation procedure for generating correction reference information, and an angle detection procedure for generating the detected angle value θs.

The correction reference information generation procedure will be described first. The correction reference information generation procedure is performed by the control unit (not illustrated) outside the angle sensor 1 before shipment of the angle sensor 1. The correction reference information generation procedure is performed in a situation in which the control unit can identify the angle θ to be detected. In the correction reference information generation procedure, information about a correspondence between a parameter value P and the value F is determined. The parameter value P is determined by an operation using the first detection signal S1 and the second detection signal S2. In the present embodiment, the parameter value P is determined from a variation component of the sum of the square of the first detection signal S1 and the square of the second detection signal S2. The sum of the square of the first detection signal S1 and the square of the second detection signal S2 will hereinafter be referred to as square-sum signal. The parameter value P relates to the magnitude of the variation component of the square-sum signal.

In the course of study by the inventors of the present application, it has been found that the angular error of the magnetic angle sensor typically varies depending on the strength of the magnetic field to be detected. The magnetic field to be detected will hereinafter be referred to as target magnetic field. The variations in the angular error depending on the strength of the target magnetic field will be referred to as the dependence of the angular error on the magnetic field strength. Further, in the course of study by the inventors of the present application, it has been found that the dependence of the angular error on the magnetic field strength is mainly ascribable to the fourth-order angular error component. It has also been found that the error of the first type and the error of the second type, each of which contains the fourth-order angular error component as its main component, both vary depending on the strength of the rotating magnetic field MF at the detection signal generation unit 2. The strength of the rotating magnetic field MF will hereinafter be referred to as the applied field strength.

As has been described in relation to the first embodiment, the value F is determined on the basis of the fourth-order angular error component of the angular error Ep of the uncorrected detected angle value θp. Specifically, $A_3$ corresponding to the magnitude of the fourth-order angular error component of the angular error Ep is assumed as the value F. The value F therefore varies depending on the applied field strength. Further, the error of the first type causes variations in the magnitude of the square-sum signal. The parameter value P which relates to the magnitude of the variation component of the square-sum signal therefore also varies depending on the applied field strength. In the correction reference information generation procedure, the correspondence between the parameter value P and the value F is examined while changing the applied field strength.

Now, a method for determining the correspondence between the parameter value P and the value F at any given applied field strength will be described. The square-sum signal are expressible by the following Eq. (25) by using the first detection signal S1 and the second detection signal S2 expressed by Eqs. (1) and (2).

$$S1^2 + S2^2 = \{\sin\theta + A_1\sin(3\theta - 180°)\}^2 + \{\cos\theta + A_1\cos3\theta\}^2 \quad (25)$$
$$= \sin^2\theta - 2A_1\sin\theta \cdot \sin3\theta + A_1^2\sin^2 3\theta + \cos^2\theta +$$

-continued $$2A_1\cos\theta \cdot \cos 3\theta + A_1^2\cos^2 3\theta$$

$$= 1 + A_1^2 - A_1\{\cos(-2\theta) - \cos 4\theta\} +$$

$$A_1\{\cos(-2\theta) + \cos 4\theta\}$$

$$= 1 + A_1^2 + 2A_1\cos 4\theta$$

Figure 13:
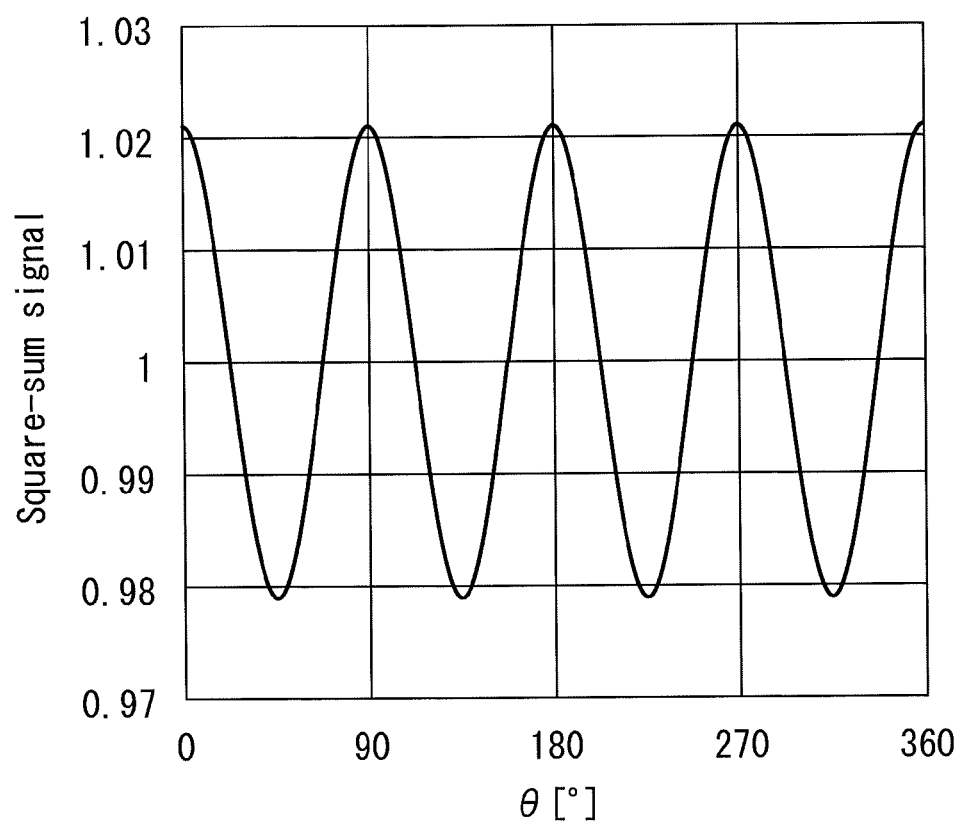
FIG. 13 is a waveform diagram illustrating an example of the waveform of a square-sum signal of the second embodiment of the invention.

In Eq. (25), "$2A_1 \cos 4\theta$" is the variable component of the square-sum signal. The parameter value P is $2A_1$ which relates to the magnitude of the variable component of this square-sum signal. In the correction reference information generation procedure, the waveform of the square-sum signal is obtained for at least a one-quarter period of the reference angle $\theta r$ equivalent to the angle $\theta$. The waveform of the square-sum signal is that of the variable component of the square-sum signal. In the correction reference information generation procedure, the parameter value P is determined from the waveform of the square-sum signal. FIG. 13 is a waveform diagram illustrating an example of the waveform of the square-sum signal. In FIG. 13, the horizontal axis represents the angle $\theta$ to be detected which is equal to the reference angle $\theta r$, and the vertical axis represents the square-sum signal. The absolute value of the parameter value P can be determined by subtracting the minimum value of the square-sum signal from the maximum value thereof, and dividing the result by two. The sign of the parameter value P, positive or negative, can be determined from the waveform of the square-sum signal.

The value F can be determined by performing the correction information determination procedure which has been described in relation to the first embodiment with reference to FIG. 8. In such a manner, the correspondence between the parameter value P and the value F at any given applied field strength is obtained.

In the correction reference information generation procedure, the correspondence between the parameter value P and the value F is repeatedly determined while changing the applied field strength. In such a manner, information about the correspondence between the parameter value P and the value F is generated. The correction reference information in the present embodiment refers to the information about the correspondence between the parameter value P and the value F. The correction reference information is stored in the correction reference information storage unit 35.

Figure 14:
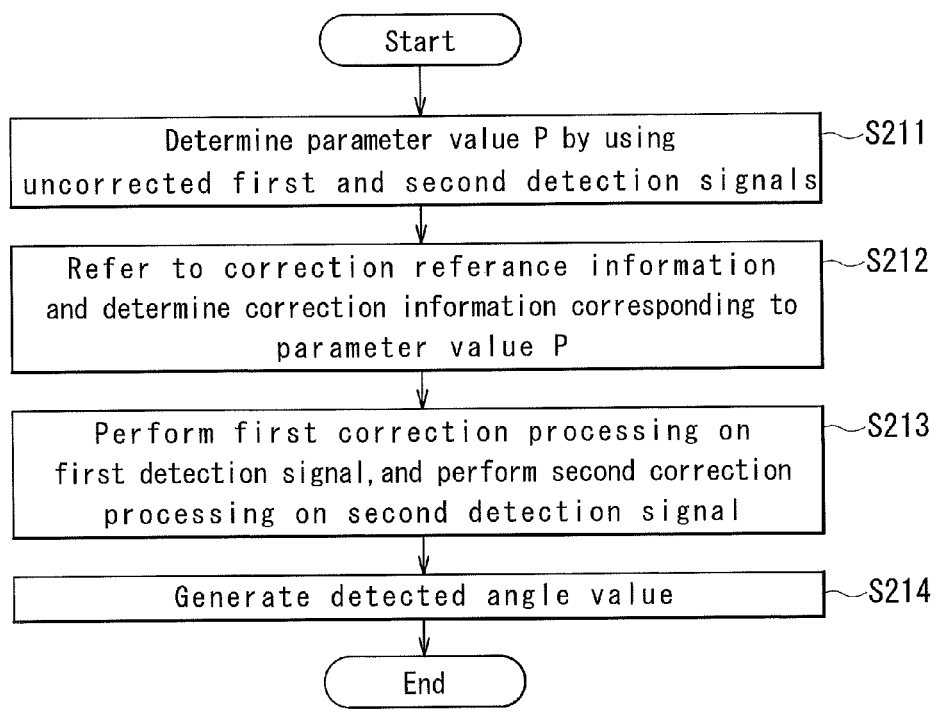
FIG. 14 is a flowchart illustrating the angle detection procedure of the second embodiment of the invention.

Reference is now made to FIGS. 12 and 14 to describe the operations of the correction apparatus 3 and the angle detection unit 4 and the angle detection procedure. FIG. 14 is a flowchart illustrating the angle detection procedure. The angle detection procedure is performed during a test operation when the angle sensor 1 is installed, and during use of the angle sensor 1. The test operation is performed by the foregoing control unit in the installation site of the angle sensor 1 before actual use of the angle sensor 1. Like the correction reference information generation procedure, this test operation is performed in a situation in which the control unit can identify the angle $\theta$ to be detected. As shown in FIG. 14, the angle detection procedure includes steps S211, S212, S213, and S214.

Step S211 is performed by the correction information determination unit 36. In step S211, the correction information determination unit 36 determines the parameter value P by using the uncorrected first and second detection signals S1 and S2. During the test operation, the parameter value P is determined in the same manner as in the correction reference information generation procedure. When the angle sensor 1 is in use, as will be described later, the angle detection unit 4 generates the detected angle value $\theta s$. When the angle sensor 1 is in use, the correction information determination unit 36 identifies the detected angle value $\theta s$, obtains the waveform of the square-sum signal for at least a one-quarter period of the detected angle value $\theta s$, and then determines the parameter value P in the same manner as in the correction reference information generation procedure.

Step S212 is performed by the correction information determination unit 36. In step S212, the correction information determination unit 36 refers to the correction reference information stored in the correction reference information storage unit 35, and determines the correction information, or the value F, corresponding to the parameter value P.

Step S213 is performed by the correction unit 33. In step S213, the correction unit 33 refers to the correction information, or the value F, determined in step S212, and performs first correction processing on the first detection signal S1 and second correction processing on the second detection signal S2. The details of the first and second correction processing are the same as those in step S111 of the first embodiment (see FIG. 9). The first and second corrected detection signals S1c and S2c are thereby generated.

Step S214 is performed by the angle detection unit 4. In step S214, the angle detection unit 4 generates the detected angle value $\theta s$. The method for calculating the detected angle value $\theta s$ is the same as that of step S112 of the first embodiment (see FIG. 9).

During the test operation, steps S211 and S212 are always performed. Subsequently, steps S211 and S212 may be set to be automatically performed, for example, at predetermined or longer time intervals. Alternatively, steps S211 and S212 may be set to be performed at desired timing according to the user's instructions, for example. The correction information determination unit 36 stores the last determined value F until steps S211 and S212 are newly performed to update the value F. When the angle sensor 1 is in operation, the correction unit 33 constantly performs step S213 by using the value F stored in the correction information determination unit 36.

The present embodiment makes it possible that even if the applied field strength changes, appropriate correction processing according to the applied field strength is performed to reduce the angular error Es of the detected angle value $\theta s$.

In general, the angular error of a magnetic angle sensor can vary depending not only on the applied field strength but also on temperature. The correction apparatus 3 according to the present embodiment is also applicable to the case where the temperature varies. In such a case, in the correction reference information generation procedure, the correspondence between the parameter value P and the value F is repeatedly determined while changing the temperature to thereby generate information about the correspondence between the parameter value P and the value F. This makes it possible that even if the temperature changes, appropriate correction processing according to the temperature is performed to reduce the angular error Es of the detected angle value $\theta s$.

The other configuration, operation, and effects of the second embodiment are the same as those of the first embodiment.

Third Embodiment

A third embodiment of the invention will now be described. First, a description will be given of the first detection signal S1 and the second detection signal S2 of the present embodiment. When the angle θ to be detected varies with a predetermined period T, the first detection signal S1 contains a first ideal component, a first error component, a second error component and a third error component, while the second detection signal S2 contains a second ideal component, a fourth error component, a fifth error component and a sixth error component. The definitions of the first and second ideal components and the first to sixth error components are the same as those described in relation to the first embodiment. In the present embodiment, the first ideal component and the second ideal component are different in phase from each other by 90°.

Figure 15:
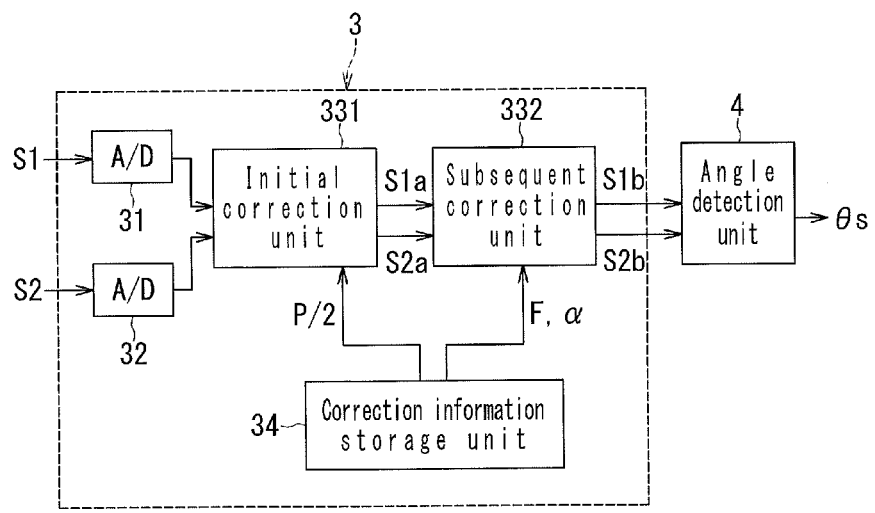
FIG. 15 is a functional block diagram illustrating the configuration of an angle detection unit and a correction apparatus according to a third embodiment of the invention.

The configuration of the correction apparatus 3 according to the present embodiment will now be described with reference to FIG. 15. FIG. 15 is a functional block diagram illustrating the configuration of the correction apparatus 3 and the angle detection unit 4. The correction apparatus 3 according to the present embodiment includes an initial correction unit 331 and a subsequent correction unit 332, in place of the correction unit 33 of the first embodiment.

The initial correction unit 331 performs first initial correction processing and second initial correction processing. The first initial correction processing is processing for correcting the first detection signal S1, which has been converted to a digital signal by the A/D converter 31, to generate a first initially-corrected detection signal S1a in which the first error component is reduced relative to that in the first detection signal S1. The second initial correction processing is processing for correcting the second detection signal S2, which has been converted to a digital signal by the A/D converter 32, to generate a second initially-corrected detection signal S2a in which the fourth error component is reduced relative to that in the second detection signal S2. In other words, the first initial correction processing and the second initial correction processing are processing for reducing the first and fourth error components which cause the error of the first type.

The subsequent correction unit 332 performs first subsequent correction processing and second subsequent correction processing. The first subsequent correction processing is processing for combining the first initially-corrected detection signal S1a and a the first correction value to generate a first subsequently-corrected detection signal S1b in which the second and third error components are reduced relative to those in the first initially-corrected detection signal S1a. The second subsequent correction processing is processing for combining the second initially-corrected detection signal S2a and a second correction value to generate a second subsequently-corrected detection signal S2b in which the fifth and sixth error components are reduced relative to those in the second initially-corrected detection signal S2a. In other words, the first subsequent correction processing and the second subsequent correction processing are processing for reducing the second, third, fifth and sixth error components which cause the error of the second type. The first subsequently-corrected detection signal S1b and the second subsequently-corrected detection signal S2b are used for the generation of the detected angle value θs by the angle detection unit 4.

The first correction value is a value that has a first amplitude and varies with a first period. The second correction value is a value that has a second amplitude and varies with a second period. The first amplitude and the second amplitude are of the same value. As in the first embodiment, the first and second amplitudes are the absolute value of the value F for defining the first and second correction values.

The first period and the second period are of the same value equal to ⅓ or ⅕ of the predetermined period T.

Now, the first detection signal S1 and the second detection signal S2 of the present embodiment will be described in more detail. In the present embodiment, the second error component and the third error component have an initial phase of the same value α, with the initial phase of the first error component as 0. The fifth error component and the sixth error component have an initial phase of the same value α, with the initial phase of the fourth error component as 0. The value α represents the phase difference between the first and fourth error components which cause the error of the first type and the second, third, fifth and sixth error components which cause the error of the second type. In the present embodiment, the value α may be 0 or a value other than 0.

The first detection signal S1 and the second detection signal S2 are expressible by the following Eqs. (26) and (27), respectively.

$$S1 = \sin\theta + A_1\sin(3\theta - 180°) - (A_2/2)\sin(3\theta + \alpha) - \quad (26)$$
$$(A_2/2)\sin(5\theta + \alpha)$$
$$= \sin\theta + A_1\sin(3\theta - 180°) + (A_2/2)\sin(3\theta - 180° + \alpha) -$$
$$(A_2/2)\sin(5\theta + \alpha)$$

$$S2 = \cos\theta + A_1\cos3\theta + (A_2/2)\cos(3\theta + \alpha) - (A_2/2)\cos(5\theta + \alpha) \quad (27)$$

In Eq. (26), "sin θ" represents the first ideal component, "$A_1 \sin(3\theta-180°)$" represents the first error component, "$(A_2/2)\sin(3\theta-180°+\alpha)$" represents the second error component, and "$-(A_2/2)\sin(5\theta+\alpha)$" represents the third error component. In Eq. (27), "cos θ" represents the second ideal component, "$A_1 \cos 3\theta$" represents the fourth error component, "$(A_2/2)\cos(3\theta+\alpha)$" represents the fifth error component, and "$-(A_2/2)\cos(5\theta+\alpha)$" represents the sixth error component. If the value α is 0, Eqs. (26) and (27) are substantially the same as Eqs. (7) and (8) in the first embodiment, respectively.

Figure 16:
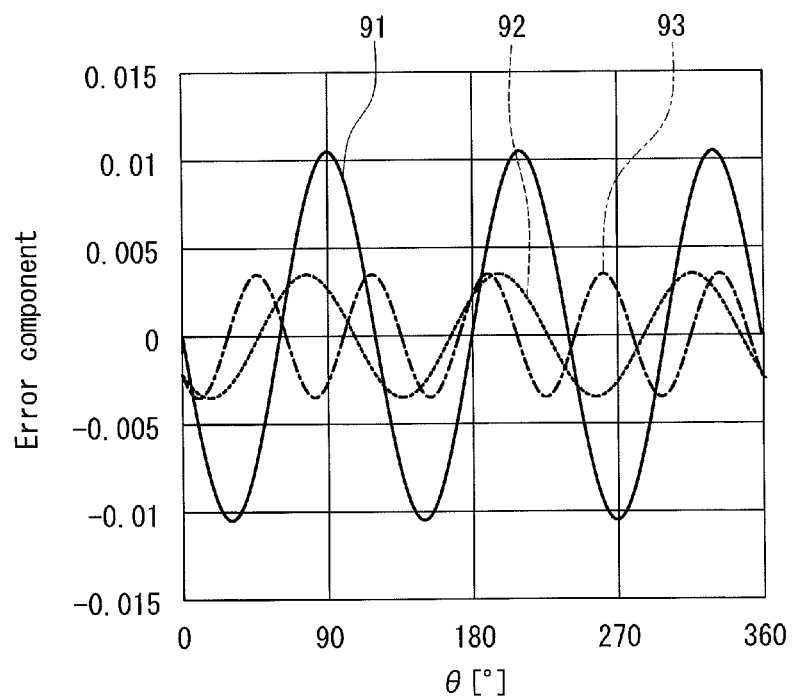
FIG. 16 is a waveform diagram illustrating an example of the waveforms of the error components of the first detection signal of the third embodiment of the invention.
Figure 17:
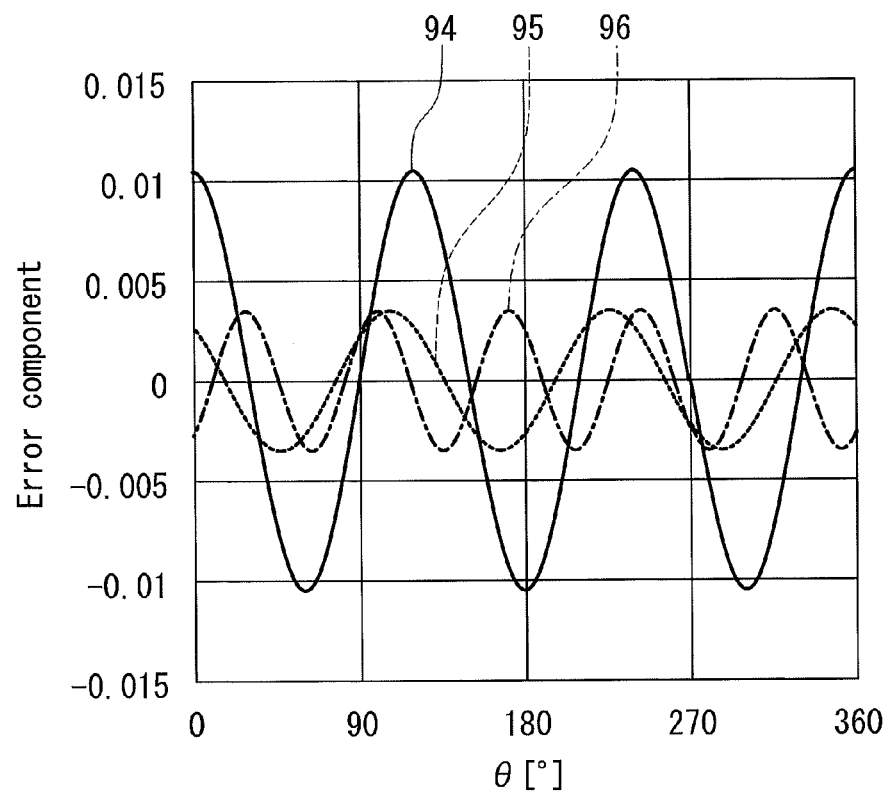
FIG. 17 is a waveform diagram illustrating an example of the waveforms of the error components of the second detection signal of the third embodiment of the invention.

FIG. 16 is a waveform diagram illustrating an example of the waveforms of the first to third error components of the first detection signal S1. FIG. 17 is a waveform diagram illustrating an example of the waveforms of the fourth to sixth error components of the second detection signal S2. In FIGS. 16 and 17, the horizontal axis represents the angle θ to be detected, and the vertical axis represents the error component. FIGS. 16 and 17 illustrate an example in which the waveforms are normalized so that the first and second ideal components have an amplitude of 1. In FIG. 16 the reference numerals 91, 92 and 93 represent the first error component, the second error component and the third error component, respectively. In FIG. 17 the reference numerals 94, 95 and 96 represent the fourth error component, the fifth error component and the sixth error component, respectively. The waveforms shown in FIGS. 16 and 17 were generated on the basis of Eqs. (26) and (27).

The correction apparatus 3 according to the present embodiment includes the correction information storage unit 34 as in the first embodiment. The correction information storage unit 34 of the present embodiment stores the value F and the value α. The subsequent correction unit 332 generates the first and second correction values on the basis of the value F, the value α, the first initially-corrected detection signal S1a and the second initially-corrected detection signal S2a. How to generate the first and second correction values will be described later.

Figure 18:
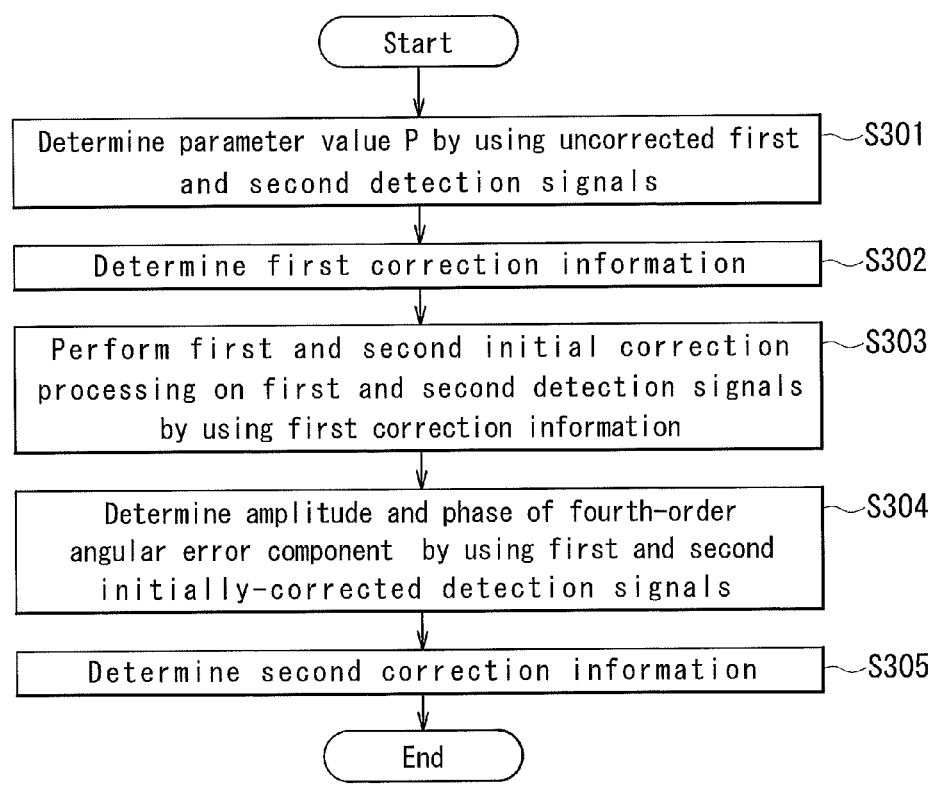
FIG. 18 is a flowchart illustrating the correction information determination procedure of the third embodiment of the invention.
Figure 19:
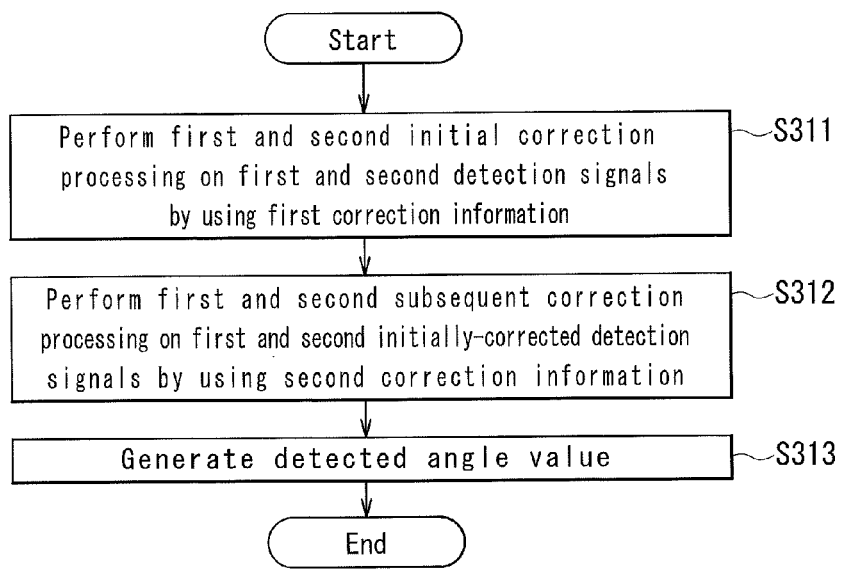
FIG. 19 is a flowchart illustrating the angle detection procedure of the third embodiment of the invention.

Reference is now made to FIGS. 15, 18 and 19 to describe the operations of the correction apparatus 3 and the angle detection unit 4 and a method for generating the detected angle value θs in the present embodiment. The method for generating the detected angle value θs in the present embodiment includes a correction information determination procedure for determining first and second correction information, and an angle detection procedure for generating the detected angle value θs. FIG. 18 is a flowchart illustrating the correction information determination procedure. The correction information determination procedure is performed by the control unit (not illustrated) outside the angle sensor 1 before shipment or use of the angle sensor 1. FIG. 19 is a flowchart illustrating the angle detection procedure. The angle detection procedure is performed when the angle sensor 1 is used.

The correction information determination procedure will be described first. As in the first embodiment, the correction information determination procedure is performed in a situation in which the control unit can identify the angle θ to be detected. As shown in FIG. 18, the correction information determination procedure includes steps S301, S302, S303, S304 and S305. In step S301, a parameter value P is determined by using the uncorrected first and second detection signals S1 and S2. In step S302, first correction information is determined. In step S303, the first initial correction processing and the second initial correction processing are performed on the first and second detection signals S1 and S2 by using the first correction information. In step S304, the amplitude and phase of the fourth-order angular error component are determined by using the first and second initially-corrected detection signals S1a and S2a. In step S305, second correction information is determined. The method for determining the parameter value P in step S301 is the same as the method for determining the parameter value P in the correction reference information generation procedure described in relation to the second embodiment.

In the present embodiment, the first correction information refers to information that defines the amplitudes and phases of correction values for use to reduce the first and fourth error components which cause the error of the first type. As has been described in relation to the second embodiment, the parameter value P is $2A_1$. If the angular error occurring without correction includes only the error of the first type, the error components of the first and second detection signals S1 and S2 are "A sin(3θ−180°)" and "$A_1$ cos 3θ", respectively. In step S302 of determining the first correction information, the first correction information is determined on the basis of the parameter value P determined in step S301. In the present embodiment, P/2 is assumed as the first correction information. The first correction information P/2 is stored in the correction information storage unit 34.

In step S303, the first initial correction processing and the second initial correction processing are performed on the first and second detection signals S1 and S2 by using the first correction information P/2 determined in step S302. In the first initial correction processing, a correction value C1a for use to reduce the first error component is initially generated on the basis of the first correction information P/2 and the first detection signal S1. Then, the first detection signal S1 and the correction value C1a are combined to generate the first initially-corrected detection signal S1a.

In the second initial correction processing, a correction value C2a for use to reduce the fourth error component is initially generated on the basis of the first correction information P/2 and the second detection signal S2. Then, the second detection signal S2 and the correction value C2a are combined to generate the second initially-corrected detection signal S2a.

In step S303, the correction values C1a and C2a and the initially-corrected detection signals S1a and S2a are generated, for example, for one period of the reference angle θr equivalent to the angle θ. Now, a description will be given of the correction values C1a and C2a and the initially-corrected detection signals S1a and S2a at any given reference angle θr. The correction values C1a and C2a are expressed by the following Eqs. (28) and (29), respectively.

$$C1a = -(P/2)\sin(3\theta p - 180°) \quad (28)$$

$$C2a = -(P/2)\cos 3\theta p \quad (29)$$

Eqs. (28) and (29) are obtained by replacing "F" in Eqs. (13) and (14) of the first embodiment with "P/2", respectively. Eqs. (13) and (14) represent the first correction value C1 and the second correction value C2 in the case where the first period and the second period are of the same value equal to ⅓ of the predetermined period T. In step S303, the correction values C1a and C2a can be determined by the same method as the method for generating the first and second correction values C1 and C2 in the foregoing case.

The first initially-corrected detection signal S1a and the second initially-corrected detection signal S2a are expressed by the following Eqs. (30) and (31), respectively.

$$S1a = S1 + C1a \quad (30)$$

$$S2a = S2 + C2a \quad (31)$$

In step S304, the amplitude and phase of the fourth-order angular error component are determined by using the first and second initially-corrected detection signals S1a and S2a generated in step S303. In step S304, for example, an angular error for one period of the reference angle θr equivalent to the angle θ is calculated. A method for calculating the angular error at any given reference angle θr will be described below. First, an initially-corrected detected angle value θa is determined on the basis of the first and second initially-corrected detection signals S1a and S2a. Assume that a phase difference between the initially-corrected detected angle value θa and the reference angle θr is 0° or near 0°. The initially-corrected detected angle value θa is calculated by the following Eq. (32).

$$\theta a = a\tan(S1a/S2a) \quad (32)$$

If θa is in the range of 0° to less than 360°, θa in Eq. (32) has two solutions 180° different in value. Which of the two solutions of θa in Eq. (32) is the true value of θa can be determined from the combination of positive and negative signs of S1a and S2a. In step S304, θa is determined within the range of 0° to less than 360° on the basis of Eq. (32) and the foregoing determination on the combination of positive and negative signs of S1a and S2a.

Next, a difference Ea between the initially-corrected detected angle value θa and the reference angle θr is calculated by the following Eq. (33).

$$Ea = \theta a - \theta r \quad (33)$$

Figure 20:
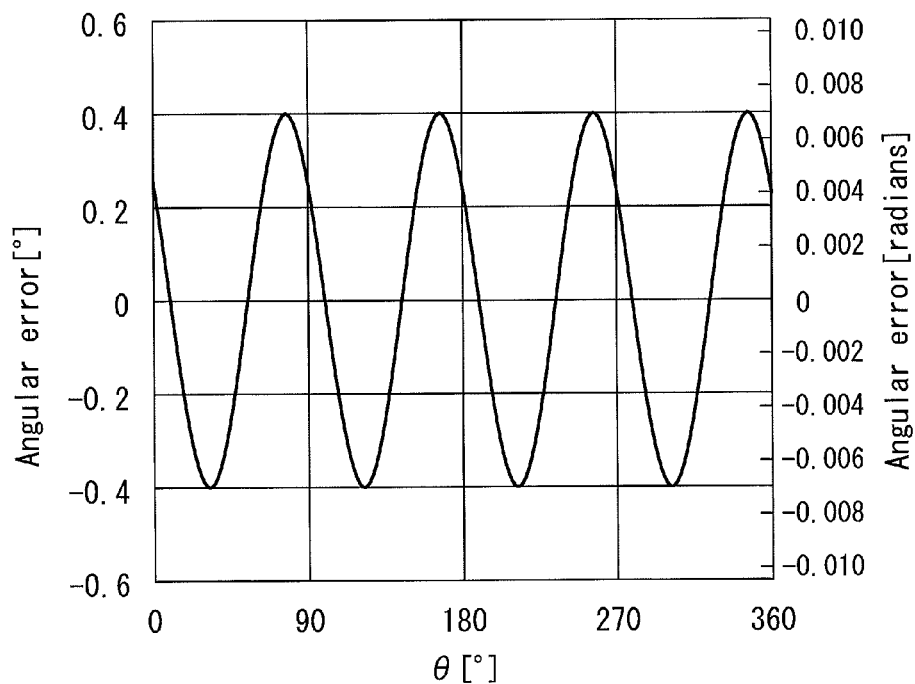
FIG. 20 is a waveform diagram illustrating an example of the waveform of an angular error of an initially-corrected detected angle value of the third embodiment of the invention.

The difference Ea is equivalent to the angular error when only the first and second initial correction processing is performed as the correction processing. The difference Ea will hereinafter be referred to as the angular error of the initially-corrected detected angle value θa. The angular error Ea contains the fourth-order angular error component as its main component. In step S304, the amplitude and phase of the fourth-order angular error component of the angular error Ea are determined from the angular error Ea determined as described above. The amplitude and phase can be determined from the waveform of the angular error Ea. FIG. 20 is a waveform diagram illustrating an example of the waveform of the angular error Ea. In FIG. 20, the horizontal axis represents the angle θ to be detected which is equal to the reference angle θr, the vertical axis on the left represents the angular error in degrees (°), and the vertical axis on the right represents the angular error in radians. In radian notation, the fourth-order angular error component of the angular error Ea is expressed as $-A_4 \sin(4\theta+\beta)$. From the amplitude and phase of the fourth-order angular error component of the angular error Ea, $A_4$ and $\beta$ are identified.

In the present embodiment, the second correction information refers to information on the foregoing value F, and the value α which represents the initial phase of the second, third, fifth and sixth error components. In step S305 of determining the second correction information, the value F and the value α are determined on the basis of the amplitude and phase of the fourth-order angular error component of the angular error Ea determined in step S304. In the present embodiment, $A_4$ is assumed as the value F, and β is assumed as the value α. The value F and the value α are stored in the correction information storage unit 34.

Next, the angle detection procedure will be described. As shown in FIG. 19, the angle detection procedure includes steps S311, S312 and S313. In step S311, the first initial correction processing and the second initial correction processing are performed on the first and second detection signals S1 and S2 by using the first correction information. In step S312, the first subsequent correction processing and the second subsequent correction processing are performed on the first and second initially-corrected detection signals S1a and S2a by using the second correction information. In step S313, the detected angle value θs is generated.

Step S311 will be described first. Step S311 is performed by the initial correction unit 331. In step S311, first, the initial correction unit 331 refers to the first correction information P/2 stored in the correction information storage unit 34. The initial correction unit 331 then performs the first initial correction processing and the second initial correction processing on the first and second detection signals S1 and S2 by using the first correction information P/2.

In the first initial correction processing, first, a correction value C1a is generated on the basis of the first correction information P/2 and the first detection signal S1. Then, the first detection signal S1 and the correction value C1a are combined to generate the first initially-corrected detection signal S1a. The method for generating the correction value C1a and the first initially-corrected detection signal S1a is the same as step S303 (see FIG. 18) in the correction information determination procedure.

In the second initial correction processing, first, a correction value C2a is generated on the basis of the first correction information P/2 and the second detection signal S2. Then, the second detection signal S2 and the correction value C2a are combined to generate the second initially-corrected detection signal S2a. The method for generating the correction value C2a and the second initially-corrected detection signal S2a is the same as step S303 (see FIG. 18) in the correction information determination procedure.

Next, step S312 will be described in detail. Step S312 is performed by the subsequent correction unit 332. In step S312, the subsequent correction unit 332 first refers to the second correction information, i.e, the value F and the value α, stored in the correction information storage unit 34. The subsequent correction unit 332 then generates first and second correction values C1b and C2b on the basis of the value F, the value α, the first initially-corrected detection signal S1a and the second initially-corrected detection signal S2a.

As previously mentioned, the first period of the first correction value C1b and the second period of the second correction value C2b are of the same value equal to ⅓ or ⅕ of the predetermined period T. First, a description will be given of the case where the first period and the second period are of the same value equal to ⅓ of the predetermined period T. In this case, the first correction value C1b and the second correction value C2b are expressed by the following Eqs. (34) and (35), respectively.

$$C1b = -F \sin(3\theta a - 180° + \alpha) \quad (34)$$

$$C2b = -F \cos(3\theta a + \alpha) \quad (35)$$

The subsequent correction unit 332 may determine the initially-corrected detected angle value θa from the first and second initially-corrected detection signals S1a and S2a before correction by using Eq. (32), and substitute the determined θa into Eqs. (34) and (35) to determine the first and second correction values C1b and C2b.

Alternatively, the subsequent correction unit 332 may determine the first and second correction values C1b and C2b as below, without determining the initially-corrected detected angle value θa. Eqs. (34) and (35) can be transformed into the following Eqs. (36) and (37), respectively.

$$\begin{aligned} C1b &= F(\sin 3\theta a \cdot \cos\alpha + \cos 3\theta a \cdot \sin\alpha) \\ &= -F\cos\alpha(4\sin^3\theta a - 3\sin\theta a) + F\sin\alpha(4\cos^3\theta a - 3\cos\theta a) \end{aligned} \quad (36)$$

$$\begin{aligned} C2b &= -F(\cos 3\theta a \cdot \cos\alpha - \sin 3\theta a \cdot \sin\alpha) \\ &= -F\cos\alpha(4\cos^3\theta a - 3\cos\theta a) - F\sin\alpha(4\sin^3\theta a - 3\sin\theta a) \end{aligned} \quad (37)$$

In Eqs. (36) and (37), sin θa and cos θa represent the values of the first initially-corrected detection signal S1a and the second initially-corrected detection signal S2a, normalized to an amplitude of 1, respectively. The first and second correction values C1b and C2b can thus be calculated by using the value F, the value α, the value sin θa of the first initially-corrected detection signal S1a and the value cos θa of the second initially-corrected detection signal S2a.

Next, a description will be given of the case where the first period and the second period are of the same value equal to ⅕ of the predetermined period T. In this case, the first correction value C1b and the second correction value C2b are expressed by the following Eqs. (38) and (39), respectively.

$$C1b = -F \sin(5\theta a - 180° + \alpha) \quad (38)$$

$$C2b = F \cos(5\theta a + \alpha) \quad (39)$$

The subsequent correction unit 332 may determine the initially-corrected detected angle value θa from the first and second initially-corrected detection signals S1a and S2a before correction by using Eq. (32), and substitute the determined θa into Eqs. (38) and (39) to determine the first and second correction values C1b and C2b.

Alternatively, the subsequent correction unit 332 may determine the first and second correction values C1b and C2b as below, without determining the initially-corrected detected angle value θa. Eqs. (38) and (39) can be transformed into the following Eqs. (40) and (41), respectively.

$$C1b = F(\sin 5\theta a \cdot \cos\alpha + \cos 5\theta a \cdot \sin\alpha) \quad (40)$$
$$= F\cos\alpha(16\sin^5\theta a - 20\sin^3\theta a + 5\sin\theta a) +$$
$$F\sin\alpha(16\cos^5\theta a - 20\cos^3\theta a + 5\cos\theta a)$$

$$C2b = F(\cos 5\theta a \cdot \cos\alpha - \sin 5\theta a \cdot \sin\alpha) \quad (41)$$
$$= F\cos\alpha(16\cos^5\theta a - 20\cos^3\theta a + 5\cos\theta a) -$$
$$F\sin\alpha(16\sin^5\theta a - 20\sin^3\theta a + 5\sin\theta a)$$

Thus, in the case where the first period and the second period are of the same value equal to ⅕ of the predetermined period T, the first and second correction values C1$b$ and C2$b$ can also be calculated by using the value F, the value α, the value sin θa of the first initially-corrected detection signal S1$a$ and the value cos θa of the second initially-corrected detection signal S2$a$.

After generating the first and second correction values C1$b$ and C2$b$ as described above, the subsequent correction unit 332 performs the first subsequent correction processing and the second subsequent correction processing. In the first subsequent correction processing, the first initially-corrected detection signal S1$a$ and the first correction value C1$b$ are combined to generate the first subsequently-corrected detection signal S1$b$. In the second subsequent correction processing, the second initially-corrected detection signal S2$a$ and the second correction value C2$b$ are combined to generate the second subsequently-corrected detection signal S2$b$. The first subsequently-corrected detection signal S1$b$ and the second subsequently-corrected detection signal S2$b$ are expressed by the following Eqs. (42) and (43), respectively.

$$S1b = S1a + C1b \quad (42)$$
$$S2b = S2a + C2b \quad (43)$$

The combination of C1$b$ and C2$b$ in Eqs. (42) and (43) may be that of C1$b$ and C2$b$ expressed by Eqs. (34) and (35), or that of C1$b$ and C2$b$ expressed by Eqs. (38) and (39).

Next, step S313 will be described in detail. Step S313 is performed by the angle detection unit 4. In step S313, the angle detection unit 4 calculates the detected angle value θs on the basis of the first and second subsequently-corrected detection signals S1$b$ and S2$b$ generated in step S312. Specifically, for example, the angle detection unit 4 calculates θs by the following Eq. (44).

$$\theta s = a\tan(S1b/S2b) \quad (44)$$

If θs is in the range of 0° to less than 360°, θs in Eq. (44) has two solutions 180° different in value. Which of the two solutions of θs in Eq. (44) is the true value of θs can be determined from the combination of positive and negative signs of S1$b$ and S2$b$. The angle detection unit 4 determines θs within the range of 0° to less than 360° on the basis of Eq. (44) and the foregoing determination on the combination of positive and negative signs of S1$b$ and S2$b$.

The present embodiment enables reducing the angular error of the detected angle value θs even in the case where the phase difference between an error component that causes the error of the first type and an error component that causes the error of the second type, or the value α, is other than zero.

The other configuration, operation, and effects of the third embodiment are the same as those of the first embodiment.

Fourth Embodiment

Figure 21:
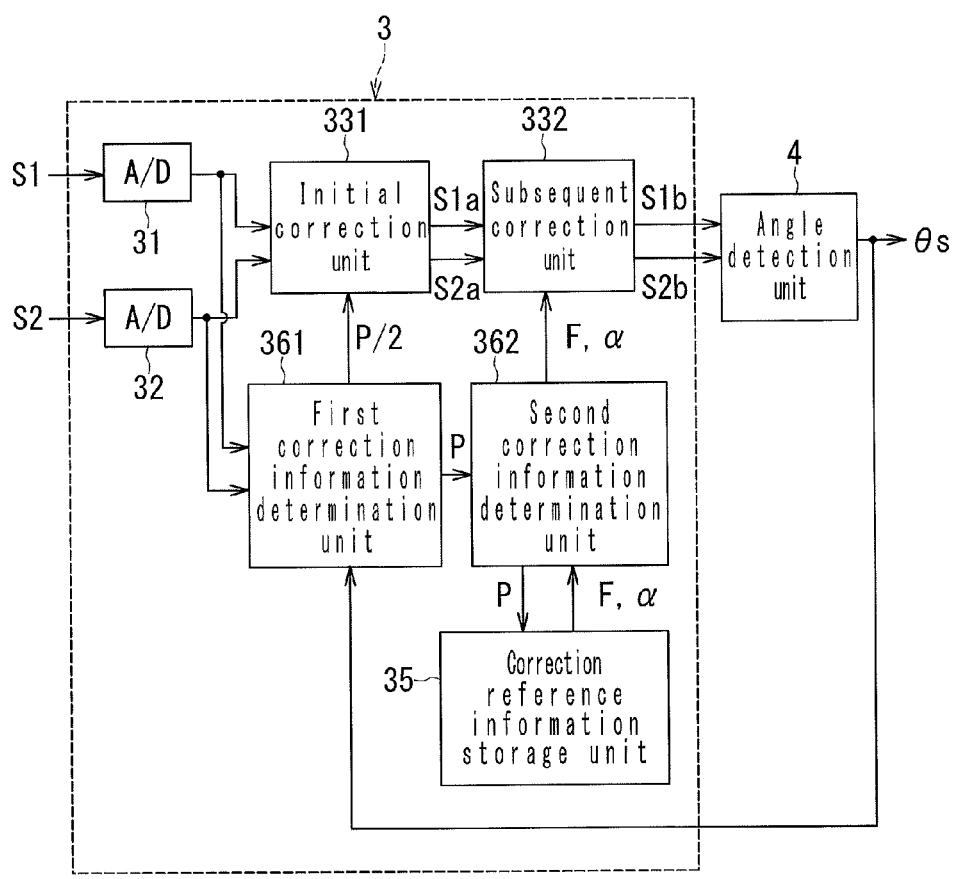
FIG. 21 is a functional block diagram illustrating the configuration of an angle detection unit and a correction apparatus according to a fourth embodiment of the invention.

A fourth embodiment of the invention will now be described. First, the configuration of the correction apparatus 3 according to the fourth embodiment will be described with reference to FIG. 21. FIG. 21 is a functional block diagram illustrating the configuration of the correction apparatus 3 and the angle detection unit 4. The correction apparatus 3 according to the present embodiment includes a correction reference information storage unit 35, a first correction information determination unit 361 and a second correction information determination unit 362, in place of the correction information storage unit 34 of the third embodiment.

The correction reference information storage unit 35 stores information about a correspondence between a parameter value P and the values F and α. The parameter value P is determined by an operation using the first detection signal S1 and the second detection signal S2. The first correction information determination unit 361 determines the parameter value P by performing the operation using the first detection signal S1 and the second detection signal S2. The parameter value P is determined by the same method as the method for determining the parameter value P in the correction reference information generation procedure described in relation to the second embodiment. In the present embodiment, the initial correction unit 331 determines the details of the first initial correction processing and the second initial correction processing on the basis of the parameter value P determined by the first correction information determination unit 361. The second correction information determination unit 362 refers to the information stored in the correction reference information storage unit 35 to determine the values F and α corresponding to the parameter value P determined by the first correction information determination unit 361.

A method for generating the detected angle value θs in the present embodiment will now be described. The method for generating the detected angle value θs in the present embodiment includes a correction reference information generation procedure for generating correction reference information, and an angle detection procedure for generating the detected angle value θs.

The correction reference information generation procedure will be described first. The correction reference information generation procedure is performed by the control unit (not illustrated) outside the angle sensor 1 before shipment of the angle sensor 1. The correction reference information generation procedure is performed in a situation in which the control unit can identify the angle θ to be detected. In the correction reference information generation procedure, information about a correspondence between a parameter value P and the values F and α is determined. The parameter value P is determined by an operation using the first detection signal S1 and the second detection signal S2.

As has been described in relation to the second embodiment, the value F and the parameter value P vary depending on the applied field strength or temperature. In the correction reference information generation procedure, the correspondence between the parameter value P and the value F is examined while changing the applied field strength or temperature. The method for determining the correspondence between the parameter value P and the value F is the same as that of the second embodiment. In the present embodiment, the value α is further determined while changing the applied field strength or temperature. The value α can be determined by performing the correction information determination procedure of the third embodiment (see FIG. 18). In such a manner, information about the correspondence between the parameter value P and the values F and α is obtained. The correction reference information in the present embodiment is the information about the correspondence between the parameter value P and the values F and α. The correction reference information is stored in the correction reference information storage unit 35.

Figure 22:
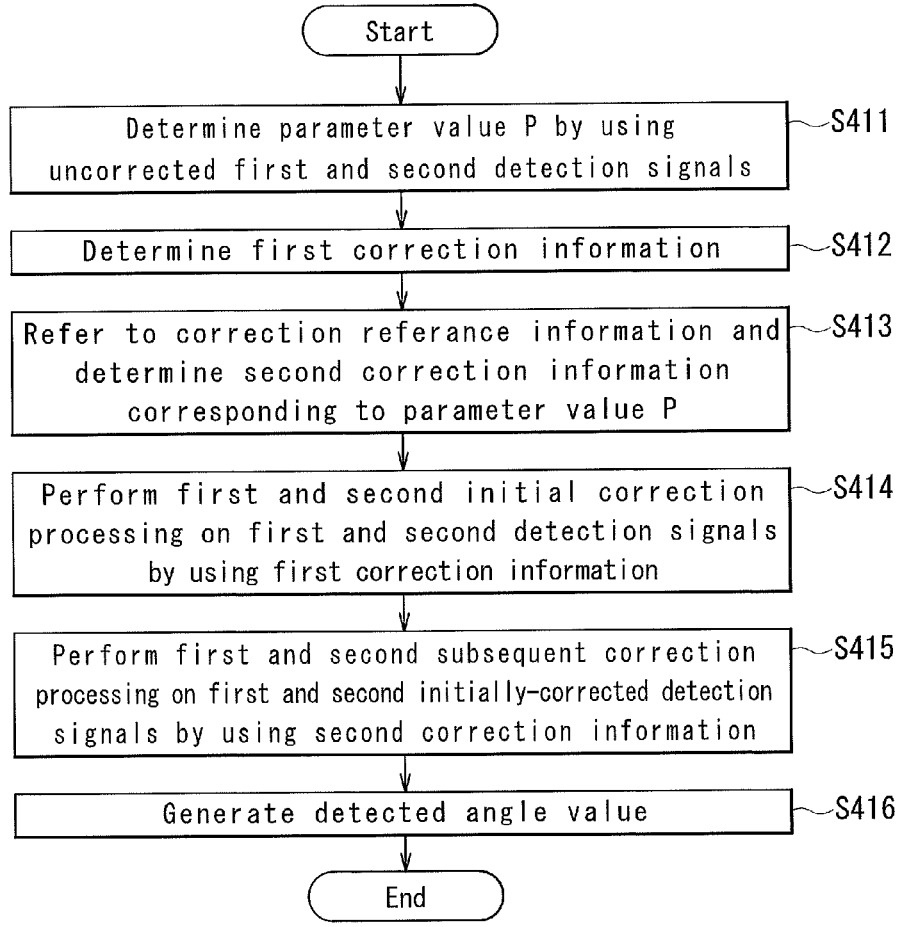
FIG. 22 is a flowchart illustrating the angle detection procedure of the fourth embodiment of the invention.

Reference is now made to FIGS. 21 and 22 to describe the operations of the correction apparatus 3 and the angle detection unit 4 and the angle detection procedure. FIG. 22 is a flowchart illustrating the angle detection procedure. The angle detection procedure is performed during a test operation when the angle sensor 1 is installed, and during use of the angle sensor 1. The test operation is performed by the foregoing control unit in the installation site of the angle sensor 1 before actual use of the angle sensor 1. Like the correction reference information generation procedure, this test operation is performed in a situation in which the control unit can identify the angle θ to be detected. As shown in FIG. 22, the angle detection procedure includes steps S411, S412, S413, S414, S415 and S416.

Step S411 is performed by the first correction information determination unit 361. In step S411, the first correction information determination unit 361 initially determines the parameter value P by using the uncorrected first and second detection signals S1 and S2. During the test operation, the parameter value P is determined in the same manner as in the correction reference information generation procedure. When the angle sensor 1 is in use, as will be described later, the angle detection unit 4 generates the detected angle value θs. When the angle sensor 1 is in use, the first correction information determination unit 361 identifies the detected angle value θs, obtains the waveform of the square-sum signal for at least a one-quarter period of the detected angle value θs, and then determines the parameter value P in the same manner as in the correction reference information generation procedure.

Step S412 is performed by the first correction information determination unit 361. In step S412, the first correction information determination unit 361 determines first correction information. The first correction information refers to information that defines the amplitudes and phases of correction values for use to reduce the first and fourth error components which cause the error of the first type. In the present embodiment, the first correction information is determined on the basis of the parameter value P determined in step S411. In the present embodiment, P/2 is assumed as the first correction information.

Step S413 is performed by the second correction information determination unit 362. In step S413, the second correction information determination unit 362 refers to the correction reference information to determine the values F and α, i.e., the second correction information corresponding to the parameter value P determined in step S411.

Step S414 is performed by the initial correction unit 331. In step S414, the initial correction unit 331 performs the first initial correction processing and the second initial correction processing on the first and second detection signals S1 and S2 by using the first correction information P/2 determined in step S412, and thereby generates the first and second initially-corrected detection signals S1a and S2a. The details of the first and second initial correction processing are the same as those of the first and second initial correction processing in step S311 of the third embodiment (see FIG. 19).

Step S415 is performed by the subsequent correction unit 332. In step S415, the subsequent correction unit 332 uses the second correction information determined in step S413, i.e., the value F and the value α, to perform the first subsequent correction processing and the second subsequent correction processing on the first and second initially-corrected detection signals S1a and S2a generated in step S414, and thereby generates the first and second subsequently-corrected detection signals S1b and S2b. The details of the first and second subsequent correction processing are the same as those of the first and second subsequent correction processing in step S312 of the third embodiment (see FIG. 19).

The angle detection unit 4 performs step S416 to generate the detected angle value θs. In step S416, the angle detection unit 4 calculates the detected angle value θs on the basis of the first and second subsequently-corrected detection signals S1b and S2b generated in step S415. The method for calculating the detected angle value θs is the same as that in step S313 of the third embodiment (see FIG. 19).

During the test operation, steps S411, S412 and S413 are always performed. Subsequently, steps S411, S412 and S413 may be set to be automatically performed, for example, at predetermined or longer time intervals. Alternatively, steps S411, S412 and S413 may be set to be performed at desired timing according to the user's instructions, for example.

The first correction information determination unit 361 stores the last determined first correction information until steps S411 and S412 are newly performed to update the first correction information. When the angle sensor 1 is in operation, the initial correction unit 331 constantly performs step S414 by using the first correction information stored in the first correction information determination unit 361.

The second correction information determination unit 362 stores the last determined second correction information until steps S411, S412 and S413 are newly performed to update the second correction information. When the angle sensor 1 is in operation, the subsequent correction unit 332 constantly performs step S415 by using the second correction information stored in the second correction information determination unit 362.

The present embodiment makes it possible that even if the applied field strength or temperature changes, appropriate correction processing according to the applied field strength or temperature is performed to reduce the angular error Es of the detected angle value θs.

The other configuration, operation, and effects of the fourth embodiment are the same as those of the second or third embodiment.

The present invention is not limited to the foregoing embodiments, and various modifications may be made thereto. For example, in the angle sensor of the present invention, not only the correction processing by the correction apparatus of the invention to reduce the error of the first type and the error of the second type but also other correction processing may be performed to reduce errors occurring in the detected angle value other than the error of the first type and the error of the second type. Such other correction processing may be processing to change the detected angle value, which has been corrected by the correction processing to reduce the error of the first type and the error of the second type, by a certain value to generate a new detected angle value.

The present invention is applicable not only to magnetic angle sensors but to all types of angle sensors including optical angle sensors.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A correction apparatus for use in an angle sensor, the angle sensor including: a detection signal generation unit for generating a first detection signal and a second detection signal each having a correspondence with an angle to be detected; and an angle detection unit for generating, on the basis of the first detection signal and the second detection signal, a detected angle value having a correspondence with the angle to be detected, wherein when the angle to be detected varies with a predetermined period, the first detection signal contains a first ideal component, a first third harmonic error component and a first fifth harmonic error component, while the second detection signal contains a second ideal component, a second third harmonic error component and a second fifth harmonic error component, the first ideal component and the second ideal component are different in phase from each other and vary periodically in such a manner as to trace an ideal sinusoidal curve, the first third harmonic error component is an error component equivalent to a third harmonic of the first ideal component, the first fifth harmonic error component is an error component equivalent to a fifth harmonic of the first ideal component, the second third harmonic error component is an error component equivalent to a third harmonic of the second ideal component, and the second fifth harmonic error component is an error component equivalent to a fifth harmonic of the second ideal component, the correction apparatus comprising a correction unit for performing first correction processing on the first detection signal and performing second correction processing on the second detection signal, wherein the first correction processing is processing for combining the first detection signal and a first correction value to generate a first corrected detection signal for use in generating the detected angle value, the second correction processing is processing for combining the second detection signal and a second correction value to generate a second corrected detection signal for use in generating the detected angle value, the first correction value is a value having a first amplitude and varying with a first period, the second correction value is a value having a second amplitude and varying with a second period, the first amplitude and the second amplitude are of the same value, and the first period and the second period are of the same value equal to $\frac{1}{3}$ or $\frac{1}{5}$ of the predetermined period.

2. The correction apparatus according to claim 1, wherein the angle to be detected is an angle that the direction of a rotating magnetic field in a reference position forms with respect to a reference direction.

3. The correction apparatus according to claim 1, wherein the first third harmonic error component and the first fifth harmonic error component are different in amplitude from each other, while the second third harmonic error component and the second fifth harmonic error component are different in amplitude from each other.

4. The correction apparatus according to claim 1, wherein the first amplitude and the second amplitude are an absolute value of a value F for defining the first and second correction values.

5. The correction apparatus according to claim 4, wherein the correction unit generates the first and second correction values on the basis of the value F, the first detection signal and the second detection signal.

6. The correction apparatus according to claim 4, further comprising a correction information storage unit for storing the value F.

7. The correction apparatus according to claim 1, wherein the first ideal component and the second ideal component are different in phase from each other by 90°.

8. The correction apparatus according to claim 4, further comprising a correction reference information storage unit and a correction information determination unit, wherein the correction reference information storage unit stores information about a correspondence between a parameter value and the value F, the parameter value being determined by an operation using the first detection signal and the second detection signal, and the correction information determination unit determines the parameter value by performing the operation using the first detection signal and the second detection signal, and refers to the information stored in the correction reference information storage unit to determine the value F corresponding to the determined parameter value.

9. The correction apparatus according to claim 8, wherein the first ideal component and the second ideal component are different in phase from each other by 90°.

10. The correction apparatus according to claim 9, wherein the parameter value is determined from a variation component of a sum of a square of the first detection signal and a square of the second detection signal.

11. An angle sensor comprising:

a detection signal generation unit for generating a first detection signal and a second detection signal each having a correspondence with an angle to be detected;

an angle detection unit for generating, on the basis of the first detection signal and the second detection signal, a detected angle value having a correspondence with the angle to be detected; and the correction apparatus according to claim 1.

12. A correction apparatus for use in an angle sensor, the angle sensor including: a detection signal generation unit for generating a first detection signal and a second detection signal each having a correspondence with an angle to be detected; and an angle detection unit for generating, on the basis of the first detection signal and the second detection signal, a detected angle value having a correspondence with the angle to be detected, wherein when the angle to be detected varies with a predetermined period, the first detection signal contains a first ideal component, a first error component, a second error component and a third error component, while the second detection signal contains a second ideal component, a fourth error component, a fifth error component and a sixth error component, the first ideal component and the second ideal component are different in phase from each other and vary periodically in such a manner as to trace an ideal sinusoidal curve, the first error component and the second error component are error components both equivalent to a third harmonic of the first ideal component, the third error component is an error component equivalent to a fifth harmonic of the first ideal component, the fourth error component and the fifth error component are error components both equivalent to a third harmonic of the second ideal component, the sixth error component is an error component equivalent to a fifth harmonic of the second ideal component, the second error component and the third error component are of the same amplitude, and the fifth error component and the sixth error component are of the same amplitude, the correction apparatus comprising:

an initial correction unit for performing first initial correction processing and second initial correction processing; and a subsequent correction unit for performing first subsequent correction processing and second subsequent correction processing, wherein the first initial correction processing is processing for correcting the first detection signal to generate a first initially-corrected detection signal in which the first error component is reduced relative to that in the first detection signal, the second initial correction processing is processing for correcting the second detection signal to generate a second initially-corrected detection signal in which the fourth error component is reduced relative to that in the second detection signal, the first subsequent correction processing is processing for combining the first initially-corrected detection signal and a first correction value to generate a first subsequently-corrected detection signal in which the second and third error components are reduced relative to those in the first initially-corrected detection signal, the second subsequent correction processing is processing for combining the second initially-corrected detection signal and a second correction value to generate a second subsequently-corrected detection signal in which the fifth and sixth error components are reduced relative to those in the second initially-corrected detection signal, the first subsequently-corrected detection signal and the second subsequently-corrected detection signal are for use in generating the detected angle value, the first correction value is a value having a first amplitude and varying with a first period, the second correction value is a value having a second amplitude and varying with a second period, the first amplitude and the second amplitude are of the same value, and the first period and the second period are of the same value equal to ⅓ or ⅕ of the predetermined period.

13. The correction apparatus according to claim 12, wherein the angle to be detected is an angle that the direction of a rotating magnetic field in a reference position forms with respect to a reference direction.

14. The correction apparatus according to claim 12, wherein the first amplitude and the second amplitude are an absolute value of a value F for defining the first and second correction values.

15. The correction apparatus according to claim 12, wherein the first ideal component and the second ideal component are different in phase from each other by 90°.

16. The correction apparatus according to claim 14, wherein the second error component and the third error component have an initial phase of a same value $\alpha$, with an initial phase of the first error component as 0, the fifth error component and the sixth error component have an initial phase of the same value $\alpha$, with an initial phase of the fourth error component as 0, and the subsequent correction unit generates the first and second correction values on the basis of the value F, the value $\alpha$, the first initially-corrected detection signal, and the second initially-corrected detection signal.

17. The correction apparatus according to claim 16, further comprising a correction information storage unit for storing the value F and the value $\alpha$.

18. The correction apparatus according to claim 16, further comprising:

a correction reference information storage unit;

a first correction information determination unit; and a second correction information determination unit, wherein the correction reference information storage unit stores information about a correspondence between a parameter value and the values F and $\alpha$, the parameter value being determined by an operation using the first detection signal and the second detection signal, the first correction information determination unit determines the parameter value by performing the operation using the first detection signal and the second detection signal, the initial correction unit determines details of the first and second initial correction processing on the basis of the parameter value determined by the first correction information determination unit, and the second correction information determination unit refers to the information stored in the correction reference information storage unit, and determines the value F and the value $\alpha$ corresponding to the parameter value determined by the first correction information determination unit.

19. The correction apparatus according to claim 18, wherein the first ideal component and the second ideal component are different in phase from each other by 90°.

20. The correction apparatus according to claim 19, wherein the parameter value is determined from a variation component of a sum of a square of the first detection signal and a square of the second detection signal.

21. An angle sensor comprising:

a detection signal generation unit for generating a first detection signal and a second detection signal each having a correspondence with an angle to be detected;

an angle detection unit for generating, on the basis of the first detection signal and the second detection signal, a detected angle value having a correspondence with the angle to be detected; and the correction apparatus according to claim 12.

* * * * *